US012451690B1

(12) United States Patent
Yue et al.

(10) Patent No.: US 12,451,690 B1
(45) Date of Patent: Oct. 21, 2025

(54) RISK ASSESSMENT METHOD FOR DISTRIBUTED POWER DISTRIBUTION NETWORK CONSIDERING LINE FAULT AND A DEVICE THEREOF

(71) Applicant: NANJING UNIVERSITY OF POSTS AND TELECOMMUNICATIONS, Nanjing (CN)

(72) Inventors: Dong Yue, Nanjing (CN); Tangyong Teng, Nanjing (CN); Xiangsen Wei, Nanjing (CN); Chunxia Dou, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 19/177,345

(22) Filed: Apr. 11, 2025

(30) Foreign Application Priority Data

Apr. 17, 2024 (CN) .......................... 202410461878.9

(51) Int. Cl.
*H02J 3/00* (2006.01)
*H02J 3/38* (2006.01)

(52) U.S. Cl.
CPC .......... *H02J 3/0012* (2020.01); *H02J 3/0073* (2020.01); *H02J 3/381* (2013.01); *H02J 2203/10* (2020.01); *H02J 2203/20* (2020.01); *H02J 2300/24* (2020.01); *H02J 2300/28* (2020.01); *H02J 2300/40* (2020.01)

(58) Field of Classification Search
CPC ........ H02J 3/0012; H02J 3/0073; H02J 3/381; H02J 2203/10; H02J 2203/20; H02J 2300/24; H02J 2300/28; H02J 2300/40
See application file for complete search history.

(56) References Cited

FOREIGN PATENT DOCUMENTS

| CN | 102097808 A | * 6/2011 |
| CN | 111080169 A | 4/2020 |

(Continued)

OTHER PUBLICATIONS

Chen et al., Distribution network operational risk assessment and early warning considering multi-risk factors, IET Generation, Transmission & Distribution, vol. 14, No. 16, pp. 3139-3149, dated Jul. 1, 2020.

(Continued)

*Primary Examiner* — Charles Cai
(74) *Attorney, Agent, or Firm* — Westbridge IP LLC

(57) ABSTRACT

Disclosed are a risk assessment method for a distributed power distribution network considering a line fault and a device thereof, belonging to the field of risk assessment of faults of a power distribution network. The method includes the following steps: establishing a wind generating set output model, a photovoltaic module output model and a load model, and generating a wind generating set output data sample, a photovoltaic module output data sample and a load sample; establishing a short-term fault rate model of a wind generating set, a photovoltaic module and a line, and generating a system state sample; establishing an objective function and a constraint condition, and reconstructing the power distribution network to obtain the reconstructed power distribution network topology; carrying out the risk assessment and an entropy weight method.

8 Claims, 8 Drawing Sheets

(56) References Cited

FOREIGN PATENT DOCUMENTS

| | | | | |
|---|---|---|---|---|
| CN | 114595891 A | * | 6/2022 | ............. G06N 3/044 |
| WO | 2022055731 A1 | | 3/2022 | |

OTHER PUBLICATIONS

First Office Action issued in counterpart Chinese Patent Application No. 202410461878.9, dated May 30, 2024.
Notification to Grant Patent Right for Invention issued in counterpart Chinese Patent Application No. 202410461878.9, dated Jun. 5, 2024.
Turghun, Operation Risk Assessment of Distribution Network Considering Line Failure and Renewable Energy Access, Master's Thesis submitted to Beijing Jiaotong University, dated Mar. 15, 2022.

* cited by examiner

RISK ASSESSMENT METHOD FOR DISTRIBUTED POWER DISTRIBUTION NETWORK CONSIDERING LINE FAULT AND A DEVICE THEREOF

CROSS-REFERENCE TO RELATED APPLICATIONS

This application claims priority to Chinese Patent Application No. 202410461878.9, filed on Apr. 17, 2024, the content of which is incorporated herein by reference in its entirety.

TECHNICAL FIELD

The present disclosure relates to a risk assessment method for a distributed power distribution network considering a line fault and a device thereof, and belongs to the technical field of risk assessment of faults of a power distribution network.

BACKGROUND

With the increase of the proportion of new power supply being connected to the power distribution network, the structure of the power distribution network has gradually changed from the traditional passive unidirectional power flow to the active bidirectional power flow. Because of the characteristics such as indirectness, uncertainty and fluctuation of the distributed power supply, the distributed power supply greatly increases the difficulty of controlling the power distribution network and affects the safe operation. Researches on the risk assessment method of the new power distribution network can provide theoretical help for the connection of the distributed power supply.

At present, there are many researches on the security assessment method of a large power grid. The security assessment method of the power distribution network is basically extracted from the method of a large power grid. Therefore, many researches now ignore the consideration of the characteristics of the power distribution network. The power distribution network should follow the "N−1+1" criterion. When a certain line fails, the topology structure can be changed and reconstructed. This involves the transfer of power supply through tie switches, thereby endeavoring to ensure that the subsequent branches do not suffer a loss of load.

The assessment methods of the power distribution network and the large power grid should be different. The current assessment methods lack consideration of the component state and the operation state of the system, that is, only the risk under the stable operation of the system is considered. The security risk assessment should include both the reliability and the operation security analysis of the component state of the system of the power distribution network. Alternatively, even if the state of the system is considered, the characteristics of the power distribution network itself are not considered, that is, the assessment process and the indicator of the large power grid are directly used.

SUMMARY

The purpose of the present disclosure is to overcome the shortcomings in the prior art, provide a risk assessment method for a distributed power distribution network considering a line fault and a device thereof, and solve the problem that the existing risk assessment method for the power distribution network lacks consideration of the component state of the system and the reliability of the line.

In order to achieve the above purpose, the present disclosure is realized by using the following technical scheme.

In a first aspect, the present disclosure provides a risk assessment method for a distributed power distribution network considering a line fault, including the following steps:

generating a wind generating set output data sample, a photovoltaic module output data sample and a load sample by pre-establishing a wind generating set output model, a photovoltaic module output model and a load model;

generating a system state sample by pre-establishing a short-term fault rate model of a wind generating set, a photovoltaic module and a line, where the system state sample includes state samples of a wind generating set, a photovoltaic module and a line;

selecting the state where there is a fault in a line in the system state sample, taking a faulty line, a pre-established objective function and a constraint condition as inputs, and calling a solver to obtain the reconstructed power distribution network topology;

taking the output data sample of distributed power supply, the load sample, the state sample of the wind generating set and the photovoltaic module, and the reconstructed power distribution network topology as inputs for calculating power flow, and obtaining the voltage of each node and power flow data of each branch in each state;

taking the voltage of each node and the power flow data of each branch as an indicator of security assessment, carrying out risk assessment of voltage out-of-limit and power flow out-of-limit, and obtaining a risk value of the power distribution network in a short term.

Further generating a wind generating set output data sample, a photovoltaic module output data sample and a load sample by pre-establishing a wind generating set output model, a photovoltaic module output model and a load model includes:

establishing the wind generating set output model according to the relationship between the wind speed and the wind generating set output, where the formula is as follows:

$$P_{wt}(v) = \begin{cases} 0 & , v < v_{ci}, v > v_{co} \\ \dfrac{P_r \cdot (v - v_{ci})}{v_r - v_{ci}} & , v_{ci} < v < v_r \\ P_r & , v_r < v < v_{co} \end{cases} \quad (2)$$

$$Q_{wt}(v) = P_{wt}(v)\tan(\phi_{wt}); \quad (3)$$

where $P_{wt}(v)$ denotes a magnitude of an active power of the wind generating set output; $Q_{wt}(v)$ denotes a magnitude of a reactive power of the wind generating set output; v denotes a real-time wind speed; $v_{ci}$ denotes a cut-in wind speed of the wind generating set; $v_{co}$ denotes the cut-out wind speed of the wind generating set; $v_r$ denotes a rated wind speed of the wind generating set; $P_r$ denotes a rated power of the wind generating set; $\phi_{wt}$ denotes a power factor angle of the wind generating set;

based on a Monte Carlo method, combining the obtained data about the magnitude of the active power and the magnitude of the reactive power of the wind generating set output to obtain a wind generating set output data sample;

establishing the photovoltaic module output model according to the relationship between the light intensity and the photovoltaic module output, where the formula is as follows:

$$\begin{cases} P_{pv} = rA\eta \\ Q_{pv} = P_{pv}\tan(\phi_{pv}) \end{cases}; \quad (5)$$

where $P_{pv}$ denotes a magnitude of an active power of the photovoltaic module output; $Q_{pv}$ denotes a magnitude of a reactive power of the photovoltaic module output; r denotes the light intensity; η denotes an efficiency value of the conversion of photovoltaic energy into electric energy; A denotes a total area of the photovoltaic module; $\phi_{pv}$ denotes a power factor angle of the photovoltaic module;

based on a Monte Carlo method, combining the obtained data about the magnitude of the active power and the magnitude of the reactive power of the photovoltaic module output to obtain a photovoltaic module output data sample;

the magnitude of the active power and the magnitude of the reactive power of the load satisfying normal distribution in a short term, where the load model has a formula of:

$$f(P) = \frac{1}{\sqrt{2\pi}\sigma_p}\exp\left[-\frac{(P-\mu_p)^2}{2\sigma_p^2}\right]; \quad (6)$$

$$f(Q) = \frac{1}{\sqrt{2\pi}\sigma_q}\exp\left[-\frac{(Q-\mu_q)^2}{2\sigma_q^2}\right]; \quad (7)$$

where f(P) denotes an active power load model, f(Q) denotes a reactive power load model, P, $\mu_p$ and $\sigma_p$ denote an active power load, an expected value and a standard deviation, respectively; Q, $\mu_q$ and $\sigma_q$ denote a reactive power load, an expected value and a standard deviation, respectively;

based on a Monte Carlo method, combining the obtained data about the active power load and reactive power load to obtain a load sample.

Further, generating a system state sample by pre-establishing a short-term fault rate model of a wind generating set, a photovoltaic module and a line includes the following steps:

establishing a short-term fault rate model of a wind generating set, a photovoltaic module and a line, including a forced outage rate of a wind generating set, a short-term fault state probability of a wind generating set, a forced outage rate of a photovoltaic module, a short-term fault state probability of a photovoltaic module, and a short-term fault state probability of a line;

where the forced outage rate of the wind generating set has a formula of:

$$r_{wt} = \frac{\lambda_{wt}}{\lambda_{wt}+\mu_{wt}}; \quad (8)$$

where $r_{wt}$ denotes the forced outage rate of the wind generating set; $\lambda_{wt}$ denotes a failure rate of the wind generating set; $\mu_{wt}$ denotes a repair rate of the wind generating set;

based on a Monte Carlo method, using the short-term fault state probability of the wind generating set as a comparison value to judge the state of the wind generating set to generate the state sample of the wind generating set, where the short-term fault state probability of the wind generating set has a formula of:

$$Pr_{wt,t}=1-e^{-t\cdot r_{wt}} \quad (9);$$

where $Pr_{wt,t}$ denotes a fault probability of the wind generating set in time t; $r_{wt}$ denotes a forced outage rate of the wind generating set;

the forced outage rate of the photovoltaic module has a formula of:

$$r_{pv} = \frac{\lambda_{pv}}{\lambda_{pv}+\mu_{pv}}; \quad (10)$$

where $r_{pv}$ denotes a forced outage rate of the photovoltaic module; $\lambda_{pv}$ denotes a failure rate of the photovoltaic module; $\mu_{pv}$ denotes a repair rate of the photovoltaic module;

based on a Monte Carlo method, using the short-term fault state probability of the wind generating set as a comparison value to judge the state of the photovoltaic module to generate the state sample of the photovoltaic module, where the short-term fault state probability of the photovoltaic module has a formula of:

$$Pr_{pv,t}=1-e^{-t\cdot r_{pv}} \quad (11);$$

where $Pr_{pv,t}$ denotes a fault probability of the photovoltaic module in time t; $r_{pv}$ denotes a forced outage rate of the photovoltaic module; e denotes a natural constant;

based on a Monte Carlo method, using the short-term fault state probability of the line as a comparison value to judge the state of the line to generate the state sample of the line, where the short-term fault state probability of the line has a formula of:

$$Pr_{l,i,t}=1-e^{-t\cdot r_{l,i}} \quad (12);$$

where $Pr_{l,i,t}$ denotes a fault probability of the line i in time t; $r_{l,i}$ denotes a fault rate of the line i.

Further, selecting the state where there is a fault in a line in the system state sample, taking a faulty line, a pre-established objective function and a constraint condition as inputs, and calling a solver to obtain the reconstructed power distribution network topology includes:

taking a minimum active power loss as the objective function, which is denoted as:

$$\min P_{loss} = \sum_{ij\in E} I_{ij}^2 r_{ij}; \quad (13)$$

where $P_{loss}$ denotes the sum of active power losses of each branch; ij denotes a branch connecting a node i and a node j; $I_{ij}$ denotes the current of a branch ij; $r_{ij}$ denotes a resistance value of a branch ij; E denotes a set of branches;

a power flow constraint of power distribution network reconstruction is denoted as:

$$\sum_{i\in f(j)} P_{ij} - r_{ij}I_{ij}^{sqr} = \sum_{k\in s(j)} P_{jk} + P_j; \tag{14}$$

$$\sum_{i\in f(j)} Q_{ij} - x_{ij}I_{ij}^{sqr} = \sum_{k\in s(j)} Q_{jk} + Q_j; \tag{15}$$

$$P_j = P_j^{wind} + P_j^{pv} - P_j^{load}; \tag{16}$$

$$Q_j = Q_j^{wind} + Q_j^{pv} - Q_j^{load}; \tag{17}$$

$$U_j^{sqr} = U_i^{sqr} - 2(r_{ij}P_{ij} + x_{ij}Q_{ij}) + (r_{ij}^2 + x_{ij}^2)I_{ij}^{sqr}; \tag{18}$$

$$U_i^{sqr}I_{ij}^{sqr} = P_{ij}^2 + Q_{ij}^2; \tag{19}$$

$$\begin{cases} -\alpha_{ij}M_1 \le P_{ij} \le \alpha_{ij}M_1 \\ -\alpha_{ij}M_2 \le Q_{ij} \le \alpha_{ij}M_2 \\ -\alpha_{ij}M_3 \le I_{ij} \le \alpha_{ij}M_3 \end{cases} \tag{20}$$

$P_{ij}$ and $Q_{ij}$ denote an active power and a reactive power of the branch ij, respectively; $r_{ij}$ denotes a resistance of the branch ij; $x_{ij}$ denotes a reactance of the branch ij; $P_{jk}$ denote an active power from a node j to a child node k; $Q_{jk}$ denotes a reactive power from the node j to the child node k; $P_j$ and $Q_j$ denote the active power injection and the reactive power injection of the node j, respectively;

$P_j^{load}$ and $Q_j^{load}$ denote an active power load and a reactive power load of the node j, respectively;

$P_j^{wind}$ and $Q_j^{wind}$ denote the active power injection and the reactive power injection of the wind generating set of the node j;

$P_j^{pv}$ and $Q_j^{pv}$ denote the active power injection and the reactive power injection of the photovoltaic module of the node j; f(j) and s(j) denote sets of parent nodes and child nodes of the node j; $\alpha_{ij}$ denotes the on-off state variable of the introduced branch, in which there is no power transmission on the line when the line is in the off state while the active power, the reactive power and the current of the closed branch are constrained; $M_1$, $M_2$ and $M_3$ denote positive numbers;

$U_i^{sqr}$ and $I_{ij}^{sqr}$ denote the square of voltage and the square of current; using a big M method to relax the constraint (18), which is denoted as:

$$U_j^{sqr} \le M(1-\alpha_{ij}) + U_i^{sqr} - 2(r_{ij}P_{ij} + x_{ij}Q_{ij}) + (r_{ij}^2 + x_{ij}^2)I_{ij}^{sqr}; \tag{21}$$

$$U_j^{sqr} \ge -M(1-\alpha_{ij}) + U_i^{sqr} - 2(r_{ij}P_{ij} + x_{ij}Q_{ij}) + (r_{ij}^2 + x_{ij}^2)I_{ij}^{sqr}; \tag{22}$$

limiting the magnitude of the voltage and the magnitude of the current after the power distribution network reconstruction, in which the voltage and current constraints are denoted as:

$$(U_i^{min})^2 \le U_i^{sqr} \le (U_i^{max})^2; \tag{23}$$

$$U_0^2 = 1; \tag{24}$$

$$0 \le I_{ij}^{sqr} \le (I_{ij}^{max})^2; \tag{25}$$

$U_i^{min}$ and $U_i^{max}$ denote a minimum value and a maximum value allowed for the voltage of the node i; $U_0$ denotes the voltage of a balanced node;

$I_{ij}^{max}$ denotes the maximum Current allowed for the line ij; the connectivity and radiation constraints of power distribution network reconstruction are denoted as:

$$\sum_{s\in s(j)} F_{js} - \sum_{i\in f(j)} F_{ij} = -1, j \in N\backslash N_{DG}; \tag{26}$$

$$-M\alpha_{ij} \le F_{ij} \le M\alpha_{ij}; \tag{27}$$

$$-M(2-\alpha_{ij}) \le F_{ij} \le M(2-\alpha_{ij}); \tag{28}$$

$$\sum_{ij\in\Omega_B} \alpha_{ij} = n-1; \tag{29}$$

where $F_{ij}$ and $F_{js}$ denote the virtual power flow flowing from i to j and flowing from j to s, respectively, and the virtual load is 1; s(j) and f(j) denote a child node and a parent node of the node j; $N_{DG}$ denotes a set of source nodes; n denotes the number of system nodes; $\Omega_B$ denote a set of branches;

relaxing the formula (19), in which the relaxation process is denoted by formulas (30) to (32):

$$U_i^{sqr}I_{ij}^{sqr} \ge P_{ij}^2 + Q_{ij}^2; \tag{30}$$

$$\frac{(I_{ij}^{sqr} + U_i^{sqr})^2 - (I_{ij}^{sqr} - U_i^{sqr})^2}{4} \ge P_{ij}^2 + Q_{ij}^2; \tag{31}$$

$$(I_{ij}^{sqr} + U_i^{sqr})^2 \ge (2P_{ij})^2 + (2Q_{ij})^2 + (I_{ij}^{sqr} - U_i^{sqr})^2; \tag{32}$$

a second-order cone relaxation method is denoted as:

$$\left\| \begin{matrix} 2P_{ij} \\ 2Q_{ij} \\ I_{ij}^{sqr} - U_i^{sqr} \end{matrix} \right\|_2 \le I_{ij}^{sqr} + U_i^{sqr}; \tag{33}$$

calling a Cplex solver through Matlab, solving the reconstruction based on the constraint condition and the objective function, taking the objective function formula (13), the constraint condition formulas (14) to (17), the constraint condition formulas (20) to (29) and the formula (33) as the input of the solver, and taking the on-off of each branch as the output to obtain the reconstructed power distribution network topology.

Further, taking the voltage of each node and the power flow data of each branch as an indicator of security assessment, carrying out risk assessment of voltage out-of-limit and power flow out-of-limit, and obtaining a risk value of the power distribution network in a short term includes:

denoting the voltage out-of-limit probability and the voltage out-of-limit severity as:

$$\begin{cases} P_v(\overline{V_i}) = P_v(V_i > V_{imax}) \\ P_v(V_i) = P_v(V_i < V_{imin}) \end{cases}; \quad (34)$$

$$\begin{cases} Sev(V_i) = \begin{cases} \dfrac{V_{imin} - V_i}{V_{imin}}, V_i < V_{imin} \\ 0, V_i \geq V_{imin} \end{cases} \\ Sev(\overline{V_i}) = \begin{cases} \dfrac{V_i - V_{imax}}{V_{imax}}, V_i > V_{imax} \\ 0, V_i \leq V_{imax} \end{cases} \end{cases}; \quad (35)$$

where $P_v(\overline{V_i})$ denotes the voltage upper out-of-limit probability; $P_v(V_i)$ denotes the voltage lower out-of-limit probability; $Sev(\overline{V_i})$ denotes the voltage upper out-of-limit risk value; $Sev(V_i)$ denotes the voltage lower out-of-limit risk value; $V_{imax}$ denotes a maximum voltage allowed for the node i, $V_{imin}$ denotes a minimum voltage; and $V_i$ denotes the voltage of the node i;

denoting the power flow out-of-limit probability and the power flow out-of-limit severity as:

$$P_S(S_{ij}) = P_S(S_{ij} > S_{ij,max}); \quad (36)$$

$$Sev(S_{ij}) = \begin{cases} \dfrac{S_{ij} - S_{ij,max}}{S_{ij,max}}, S_{ij} > S_{ij,max} \\ 0, S_{ij} \leq S_{ij,max} \end{cases}; \quad (37)$$

where $P_s(S_{ij})$ denotes the power flow out-of-limit probability; $Sev(S_{ij})$ denotes the power flow out-of-limit risk value; $S_{ij}$ denotes an active power flow of the branch ij; $S_{ij,max}$ denotes the upper limit of the active power flow allowed for the branch ij; obtaining the voltage out-of-limit risk value from the voltage out-of-limit probability and the voltage out-of-limit severity, and obtaining the power flow out-of-limit risk value from the power flow out-of-limit probability and the power flow out-of-limit severity, in which the voltage out-of-limit risk value and the power flow out-of-limit risk value are denoted as:

$$R_v = \sum P_v(\overline{V_i})Sev(\overline{V_i}) + \sum P_v(V_i)Sev(V_i); \quad (38)$$

$$R_s = \sum P_S(S_{ij})Sev(S_{ij}); \quad (39)$$

where $R_v$ and $R_s$ denote the voltage out-of-limit risk value and the power flow out-of-limit risk value;

an entropy weight method and an analytic hierarchy process are used as the method for calculating the weights of the voltage out-of-limit risk value and the power flow out-of-limit risk value, including:

taking the voltage and the power flow as two samples of the entropy weight method, and taking the four indicators of the voltage out-of-limit probability, the voltage out-of-limit severity, the power flow out-of-limit probability and the power flow out-of-limit severity as the inputs of the entropy weight method to calculate the weights, and obtaining an objective weight value of the voltage out-of-limit risk value and the power flow out-of-limit risk value;

taking the voltage and the power flow as the scheme layer of the analytic hierarchy process, taking the out-of-limit probability and the out-of-limit severity as an indicator layer, and obtaining a subjective weight value of the voltage out-of-limit risk value and the power flow out-of-limit risk value;

combining the subjective weight and the objective weight, and denoting the combined weighting method of the voltage out-of-limit risk value and the power flow out-of-limit risk value as:

$$\lambda_j(z) = \dfrac{\mu_j \omega_j(z)}{\sum_{j=1}^{n} \mu_j \omega_j(z)}; \quad (44)$$

where $\mu_j$ denotes a set of weights obtained by a subjective method, $\omega_j$ denotes a set of weights obtained by an objective method, and $\lambda_j(z)$ denotes a weight value of the combined weight; z denotes the state;

calculating the state probability, the combined weight value, the voltage out-of-limit risk value and the power flow out-of-limit risk value in each state to obtain an overall risk value, and denoting the risk assessment result as:

$$\text{Score} = \sum_{z=1}^{zz} P_g(z)(\lambda_1(z)R_v(z) + \lambda_2(z)R_s(z)); \quad (45)$$

where $P_g(z)$ denotes the probability that a z-th state appears, zz denotes the total number of states, and Score denotes the total risk value.

Further, the process of calculating the objective weight value of the voltage out-of-limit risk value and the power flow out-of-limit risk value by using an entropy weight method includes:

$$x_{ij}(z) = \dfrac{1}{X_{ij}(z)}, (i = 1, \ldots, n, j = 1, \ldots, m); \quad (40)$$

$x_{ij}$ denotes a j-th forward indicator of an i-th sample; $X_{ij}$ denotes a j-th indicator of an i-th sample; n denotes the number of samples, and m denotes the number of indicators;

$$p_{ij}(z) = \dfrac{x_{ij}(z)}{\sum_{i=1}^{n} x_{ij}(z)}; \quad (41)$$

where $p_{ij}$ denotes the proportion of the i-th sample value under the j-th indicator to the indicator;

$$e_j(z) = -k \sum_{i=1}^{n} p_{ij}(z) \ln(p_{ij}(z)); \quad (42)$$

where $e_j$ denotes the entropy value of the j-th indicator, satisfying k=1/ln(n)>0, and $e_j \geq 0$;

$$\omega_j(z) = \frac{1 - e_j(z)}{\sum_{j=1}^{m} 1 - e_j(z)}; \quad (43)$$

where $\omega_j$ denotes the weight value obtained after normalization by using the entropy weight method as the objective weight value of the voltage out-of-limit risk value and the power flow out-of-limit risk value.

In a second aspect, the present disclosure provides a risk assessment device for a distributed power distribution network considering a line fault, including:

a first sample generation module, which is configured to generate a wind generating set output data sample, a photovoltaic module output data sample and a load sample by pre-establishing a wind generating set output model, a photovoltaic module output model and a load model;

a second sample generation module, which is configured to generate a system state sample by pre-establishing a short-term fault rate model of a wind generating set, a photovoltaic module and a line, where the system state sample includes state samples of a wind generating set, a photovoltaic module and a line;

a reconstruction module, which is configured to select the state where there is a fault in a line in the system state sample, take a faulty line, a pre-established objective function and a constraint condition as inputs, and call a solver to obtain the reconstructed power distribution network topology;

a data processing module, which is configured to take the output data sample of distributed power supply, the load sample, the state sample of the wind generating set and the photovoltaic module, and the reconstructed power distribution network topology as inputs for calculating power flow, and obtain the voltage of each node and power flow data of each branch in each state;

a risk assessment module, which is configured to take the voltage of each node and the power flow data of each branch as an indicator of security assessment, carry out risk assessment of voltage out-of-limit and power flow out-of-limit, and obtain a risk value of the power distribution network in a short term.

In a third aspect, the present disclosure provides a computer-readable storage medium on which a computer program is stored, where the program, when executed by a processor, implements the steps of the method described above.

In a fourth aspect, the present disclosure provides a computer device, including:

a memory, into which a computer program/instruction is stored;

a processor, which is configured to execute the computer program/instruction to implement the steps of the method described above.

In a fifth aspect, the present disclosure provides a computer program product, including a computer program/instruction, where the computer program/instruction, when executed by a processor, implements the steps of the method described above.

Compared with the prior art, the present disclosure has the following beneficial effects.

According to the present disclosure, the influence of the operation state of the component of the power distribution network on the operation state of the system of the power distribution network in the case of a fault of the component is considered, and the recovery of the operation of the power distribution network by using a reconstruction method is consider. The problem that the influence resulted from the uncertainty of the distributed power supply is analyzed only when the power distribution network is in a safe and stable state in the prior art method is improved.

Based on the prediction of the distributed output and the prediction of the operation state of the system component in a short term, the present disclosure quantitatively calculates the voltage and power flow indicators in different operation states, thus realizing the combination of the operation security and the component reliability, and enabling the security assessment method to be more reasonable and comprehensive.

DETAILED DESCRIPTION OF THE EMBODIMENTS

The present disclosure will be further described with reference to the attached drawings hereinafter. The following embodiments are only used to illustrate the technical scheme of the present disclosure more clearly, rather than limit the scope of protection of the present disclosure.

Embodiment 1

Figure 1:
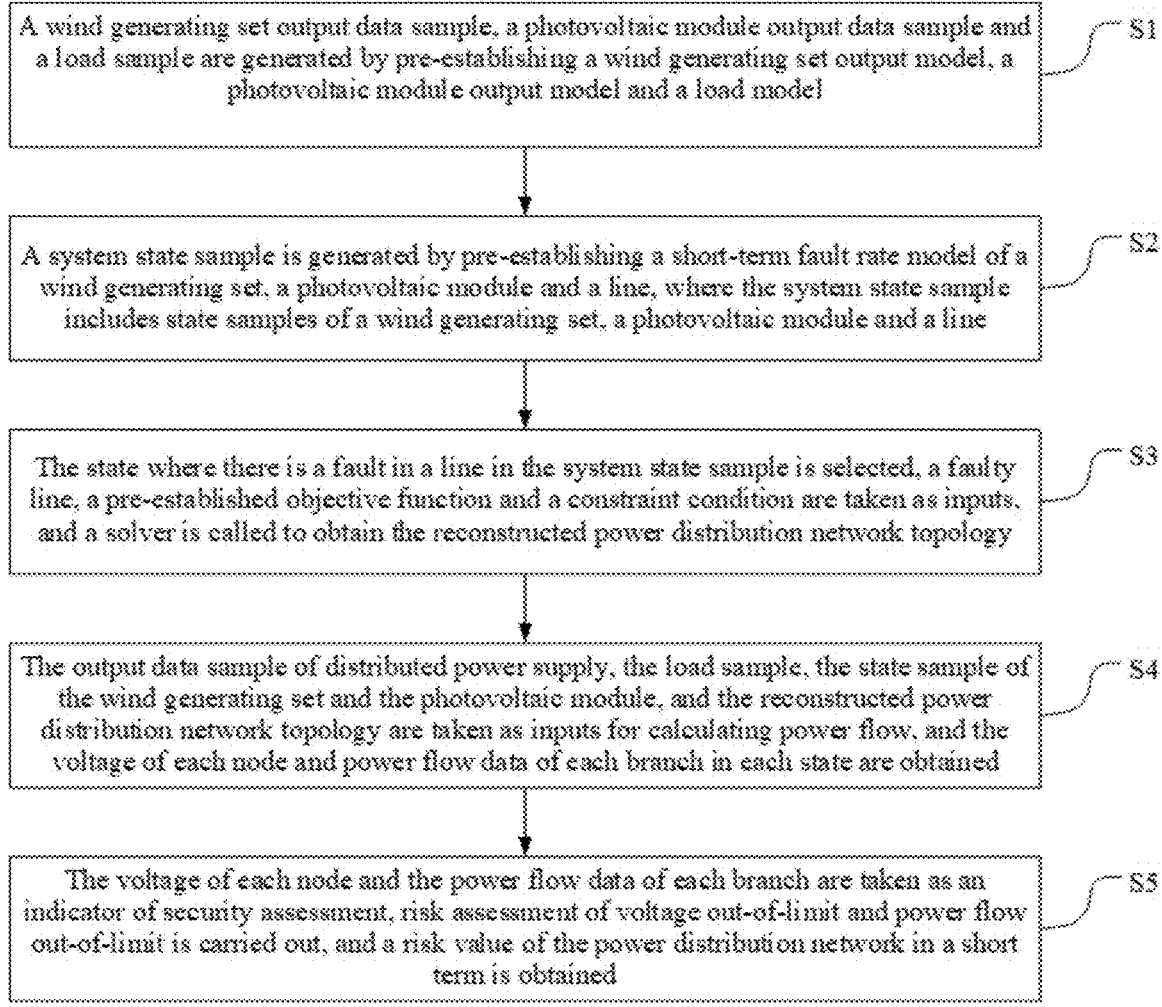
FIG. 1 is a flow chart of a risk assessment method for a distributed power distribution network considering a line fault according to an embodiment of the present disclosure.

As shown in FIG. 1, this embodiment introduces a risk assessment method for a distributed power distribution network considering a line fault, including the following steps:

generating a wind generating set output data sample, a photovoltaic module output data sample and a load sample by pre-establishing a wind generating set output model, a photovoltaic module output model and a load model;

generating a system state sample by pre-establishing a short-term fault rate model of a wind generating set, a photovoltaic module and a line, where the system state sample includes state samples of a wind generating set, a photovoltaic module and a line;

selecting the state where there is a fault in a line in the system state sample, taking a faulty line, a pre-established objective function and a constraint condition as inputs, and calling a solver to obtain the reconstructed power distribution network topology;

taking the output data sample of distributed power supply, the load sample, the state sample of the wind generating set and the photovoltaic module, and the reconstructed power distribution network topology as inputs for calculating power flow, and obtaining the voltage of each node and power flow data of each branch in each state;

taking the voltage of each node and the power flow data of each branch as an indicator of security assessment, carrying out risk assessment of voltage out-of-limit and power flow out-of-limit, and obtaining a risk value of the power distribution network in a short term.

As shown in FIG. 1, the application process of the risk assessment method for the distributed power distribution network considering the line fault according to this embodiment specifically includes the following steps.

S1: a wind generating set output data sample, a photovoltaic module output data sample and a load sample are generated by pre-establishing a wind generating set output model, a photovoltaic module output model and a load model.

The probability density formula of the wind speed is:

$$f(v) = \frac{k}{c}\left(\frac{v}{c}\right)^{k-1} \exp\left[-\left(\frac{v}{c}\right)^k\right]; \tag{1}$$

where f(v) denotes the probability density function of the wind speed; v denotes the wind speed (m/s); k denotes a shape parameter; c denotes the scale parameter.

The wind generating set output model is established according to the relationship between the wind speed and the wind generating set output, where the formula is as follows:

$$P_{wt}(v) = \begin{cases} 0 & , v < v_{ci}, v > v_{co} \\ \frac{P_r \cdot (v - v_{ci})}{v_r - v_{ci}} & , v_{ci} < v < v_r \\ P_r & , v_r < v < v_{co} \end{cases} \tag{2}$$

$$Q_{wt}(v) = P_{wt}(v)\tan(\phi_{wt}) \tag{3};$$

where $P_{wt}(v)$ denotes a magnitude of an active power of the wind generating set output; $Q_{wt}(v)$ denotes a magnitude of a reactive power of the wind generating set output; v denotes a real-time wind speed; $v_{ci}$ denotes a cut-in wind speed of the wind generating set; $v_{co}$ denotes the cut-out wind speed of the wind generating set; $v_r$ denotes a rated wind speed of the wind generating set; $P_r$ denotes a rated power of the wind generating set; $\phi_{wt}$ denotes a power factor angle of the wind generating set.

Based on a Monte Carlo method, the obtained data about the magnitude of the active power and the magnitude of the reactive power of the wind generating set output is combined to obtain a wind generating set output data sample.

The probability density formula of the light intensity is:

$$f(r) = \frac{\Gamma(\alpha + \beta)}{\Gamma(\alpha) + \Gamma(\beta)}\left(\frac{r}{r_{max}}\right)^{\alpha-1}\left(1 - \frac{r}{r_{max}}\right)^{\beta}; \tag{4}$$

where f(r) denotes the probability density function of the light intensity; α and β denote parameters of Beta distribution; r denotes an actual value (KW/m²) of solar light intensity at a certain moment in a short term; $r_{max}$ denotes the maximum light intensity (KW/m²) in a short term; Γ(·) denotes a gamma function.

The photovoltaic module output model is established according to the relationship between the light intensity and the photovoltaic module output, where the formula is as follows:

$$\begin{cases} P_{pv} = rA\eta \\ Q_{pv} = P_{pv}\tan(\phi_{pv}) \end{cases}; \tag{5}$$

where $P_{pv}$ denotes a magnitude of an active power of the photovoltaic module output; $Q_{pv}$ denotes a magnitude of a reactive power of the photovoltaic module output; r denotes the light intensity; η denotes an efficiency value of the conversion of photovoltaic energy into electric energy; A denotes a total area of the photovoltaic module; $\phi_{pv}$ denotes a power factor angle of the photovoltaic module.

Based on a Monte Carlo method, the obtained data about the magnitude of the active power and the magnitude of the reactive power of the photovoltaic module output is combined to obtain a photovoltaic module output data sample.

The magnitude of the active power and the magnitude of the reactive power of the load satisfy normal distribution in a short term, where the load model has a formula of:

$$f(P) = \frac{1}{\sqrt{2\pi}\sigma_p}\exp\left[-\frac{(P - \mu_p)^2}{2\sigma_p^2}\right]; \tag{6}$$

$$f(Q) = \frac{1}{\sqrt{2\pi}\sigma_q}\exp\left[-\frac{(Q - \mu_q)^2}{2\sigma_q^2}\right]; \tag{7}$$

where f(P) denotes an active power load model, f(Q) denotes a reactive power load model, P, $\mu_p$ and $\sigma_p$ denote an active power load, an expected value and a standard deviation, respectively; Q, $\mu_q$ and $\sigma_q$ denote a reactive power load, an expected value and a standard deviation, respectively.

Based on a Monte Carlo method, the obtained data about the active power load and reactive power load is combined to obtain a load sample.

S2: a system state sample is generated by pre-establishing a short-term fault rate model of a wind generating set, a photovoltaic module and a line, where the system state sample includes state samples of a wind generating set, a photovoltaic module and a line.

A short-term fault rate model of a wind generating set, a photovoltaic module and a line is established, including a forced outage rate of a wind generating set, a short-term fault state probability of a wind generating set, a forced outage rate of a photovoltaic module, a short-term fault state probability of a photovoltaic module, and a short-term fault state probability of a line;

where the forced outage rate of the wind generating set has a formula of:

$$r_{wt} = \frac{\lambda_{wt}}{\lambda_{wt} + \mu_{wt}}; \qquad (8)$$

where $r_{wt}$ denotes the forced outage rate of the wind generating set; $\lambda_{wt}$ denotes a failure rate of the wind generating set; $\mu_{wt}$ denotes a repair rate of the wind generating set.

Based on a Monte Carlo method, the short-term fault state probability of the wind generating set is used as a comparison value to judge the state of the wind generating set to generate the state sample of the wind generating set, where the short-term fault state probability of the wind generating set has a formula of:

$$Pr_{wt,t} = 1 - e^{-t \cdot r_{wt}} \qquad (9);$$

where $Pr_{wt,t}$ denotes a fault probability of the wind generating set in time t; $r_{wt}$ denotes a forced outage rate of the wind generating set.

The forced outage rate of the photovoltaic module has a formula of:

$$r_{pv} = \frac{\lambda_{pv}}{\lambda_{pv} + \mu_{pv}}; \qquad (10)$$

where $r_{pv}$ denotes a forced outage rate of the photovoltaic module; $\lambda_{pv}$ denotes a failure rate of the photovoltaic module; $\mu_{pv}$ denotes a repair rate of the photovoltaic module.

Based on a Monte Carlo method, the short-term fault state probability of the wind generating set is used as a comparison value to judge the state of the photovoltaic module to generate the state sample of the photovoltaic module, where the short-term fault state probability of the photovoltaic module has a formula of:

$$Pr_{pv,t} = 1 - e^{-t \cdot r_{pv}} \qquad (11);$$

where $Pr_{pv,t}$ denotes a fault probability of the photovoltaic module in time t; $r_{pv}$ denotes a forced outage rate of the photovoltaic module; e denotes a natural constant.

Based on a Monte Carlo method, the short-term fault state probability of the line is used as a comparison value to judge the state of the line to generate the state sample of the line, where the short-term fault state probability of the line has a formula of:

$$Pr_{l,i,t} = 1 - e^{-t \cdot r_{l,i}} \qquad (12);$$

where $Pr_{l,i,t}$ denotes a fault probability of the line i in time t; $r_{l,i}$ denotes a fault rate of the line i.

S3: the state where there is a fault in a line in the system state sample is selected, a faulty line, a pre-established objective function and a constraint condition are taken as inputs, and a solver is called to obtain the reconstructed power distribution network topology.

The power distribution network reconstruction takes a minimum active power loss as the objective function, which is denoted as:

$$\min P_{loss} = \sum_{ij \in E} I_{ij}^2 r_{ij}; \qquad (13)$$

where $P_{loss}$ denotes the sum of active power losses of each branch; ij denotes a branch connecting a node i and a node j; $I_{ij}$ denotes the current of a branch ij; $r_{ij}$ denotes a resistance value of a branch ij; E denotes a set of branches.

A power flow constraint of power distribution network reconstruction is denoted as:

$$\sum_{i \in f(j)} P_{ij} - r_{ij} I_{ij}^{sqr} = \sum_{k \in s(j)} P_{jk} + P_j; \qquad (14)$$

$$\sum_{i \in f(j)} Q_{ij} - x_{ij} I_{ij}^{sqr} = \sum_{k \in s(j)} Q_{jk} + Q_j; \qquad (15)$$

$$P_j = P_j^{wind} + P_j^{pv} - P_j^{load}; \qquad (16)$$

$$Q_j = Q_j^{wind} + Q_j^{pv} - Q_j^{load}; \qquad (17)$$

$$U_j^{sqr} = U_i^{sqr} - 2(r_{ij} P_{ij} + x_{ij} Q_{ij}) + (r_{ij}^2 + x_{ij}^2) I_{ij}^{sqr}; \qquad (18)$$

$$U_i^{sqr} I_{ij}^{sqr} = P_{ij}^2 + Q_{ij}^2; \qquad (19)$$

$$\begin{cases} -\alpha_{ij} M_1 \leq P_{ij} \leq \alpha_{ij} M_1 \\ -\alpha_{ij} M_2 \leq Q_{ij} \leq \alpha_{ij} M_2 \\ -\alpha_{ij} M_3 \leq I_{ij} \leq \alpha_{ij} M_3 \end{cases} ; \qquad (20)$$

$P_{ij}$ and $Q_{ij}$ denote an active power and a reactive power of the branch ij, respectively; $r_{ij}$ denotes a resistance of the branch ij; $x_{ij}$ denotes a reactance of the branch ij; $P_{jk}$ denote an active power from a node j to a child node k; $Q_{jk}$ denotes a reactive power from the node j to the child node k; $P_j$ and $Q_j$ denote the active power injection and the reactive power injection of the node j, respectively;

$P_j^{load}$ and $Q_j^{load}$ denote an active power load and a reactive power load of the node j, respectively;

$P_j^{wind}$ and $Q_j^{wind}$ denote the active power injection and the reactive power injection of the wind generating set of the node j;

$P_j^{pv}$ and $Q_j^{pv}$ denote the active power injection and the reactive power injection of the photovoltaic module of the node j; f(j) and s(j) denote sets of parent nodes and child nodes of the node j; $\alpha_{ij}$ denotes the on-off state variable of the introduced branch, in which there is no power transmission on the line when the line is in the off state while the active power, the reactive power and the current of the closed branch are constrained; $M_1$, $M_2$ and $M_3$ denote positive numbers;

$U_i^{sqr}$ and $I_{ij}^{sqr}$ denote the square of voltage and the square of current. After the inequality constraint (20) is introduced, the formula (19) can be used in the case of the branch disconnection, but the constraint formula (18) is not applicable to the case of the branch disconnection. A big M method is further used for relaxation, which is denoted as:

$$U_j^{sqr} \leq M(1-\alpha_{ij}) + U_i^{sqr} - 2(r_{ij}P_{ij} + x_{ij}Q_{ij}) + (r_{ij}^2 + x_{ij}^2)I_{ij}^{sqr}; \quad (21)$$

$$U_j^{sqr} \geq -M(1-\alpha_{ij}) + U_i^{sqr} - 2(r_{ij}P_{ij} + x_{ij}Q_{ij}) + (r_{ij}^2 + x_{ij}^2)I_{ij}^{sqr}. \quad (22)$$

The magnitude of the voltage and the magnitude of the current after the power distribution network reconstruction are limited, in which the voltage and current constraints are denoted as:

$$(U_i^{min})^2 \leq U_i^{sqr} \leq (U_i^{max})^2; \quad (23)$$

$$U_0^2 = 1; \quad (24)$$

$$0 \leq I_{ij}^{sqr} \leq (I_{ij}^{max})^2; \quad (25)$$

$U_i^{min}$ and $U_i^{max}$ denote a minimum value and a maximum value allowed for the voltage of the node i; $U_0$ denotes the voltage of a balanced node;

$I_{ij}^{max}$ denotes the maximum current allowed for the line ij.

The connectivity and radiation constraints of power distribution network reconstruction are denoted as:

$$\sum_{s \in s(j)} F_{js} - \sum_{i \in f(j)} F_{ij} = -1, j \in N \setminus N_{DG}; \quad (26)$$

$$-M\alpha_{ij} \leq F_{ij} \leq M\alpha_{ij}; \quad (27)$$

$$-M(2-\alpha_{ij}) \leq F_{ij} \leq M(2-\alpha_{ij}); \quad (28)$$

$$\sum_{ij \in \Omega_B} \alpha_{ij} = n - 1; \quad (29)$$

where $F_{ij}$ and $F_{js}$ denote the virtual power flow flowing from i to j and flowing from j to s, respectively, and the virtual load is 1; s(j) and f(j) denote a child node and a parent node of the node j; $N_{DG}$ denotes a set of source nodes; n denotes the number of system nodes; $\Omega_B$ denote a set of branches.

Since the relationship among the voltage, the current and the power is a nonlinear equality constraint, it is necessary to relax the formula (19), in which the relaxation process is denoted by formulas (30) to (32):

$$U_i^{sqr} I_{ij}^{sqr} \geq P_{ij}^2 + Q_{ij}^2; \quad (30)$$

$$\frac{(I_{ij}^{sqr} + U_i^{sqr})^2 - (I_{ij}^{sqr} - U_i^{sqr})^2}{4} \geq P_{ij}^2 + Q_{ij}^2; \quad (31)$$

$$(I_{ij}^{sqr} + U_i^{sqr})^2 \geq (2P_{ij})^2 + (2Q_{ij})^2 + (I_{ij}^{sqr} - U_i^{sqr})^2. \quad (32)$$

A second-order cone relaxation method is denoted as:

$$\left\| \begin{array}{c} 2P_{ij} \\ 2Q_{ij} \\ I_{ij}^{sqr} - U_i^{sqr} \end{array} \right\|_2 \leq I_{ij}^{sqr} + U_i^{sqr}. \quad (33)$$

A Cplex solver is called through Matlab. The reconstruction is solved based on the constraint condition and the objective function. The objective function formula (13), the constraint condition formulas (14) to (17), the constraint condition formulas (20) to (29) and the formula (33) are taken as the input of the solver. The on-off of each branch is taken as the output to obtain the reconstructed power distribution network topology.

S4: the output data sample of distributed power supply, the load sample, the state sample of the wind generating set and the photovoltaic module, and the reconstructed power distribution network topology are taken as inputs for calculating power flow, and the voltage of each node and power flow data of each branch in each state are obtained.

S5: the voltage of each node and the power flow data of each branch are taken as an indicator of security assessment, risk assessment of voltage out-of-limit and power flow out-of-limit is carried out, and a risk value of the power distribution network in a short term is obtained.

The voltage out-of-limit probability and the voltage out-of-limit severity denoted as:

$$\begin{cases} P_v(\overline{V}_i) = P_v(V_i > V_{imax}) \\ P_v(V_i) = P_v(V_i < V_{imin}) \end{cases}; \quad (34)$$

$$\begin{cases} Sev(V_i) = \begin{cases} \dfrac{V_{imin} - V_i}{V_{imin}}, & V_i < V_{imin} \\ 0, & V_i \geq V_{imin} \end{cases} \\ Sev(\overline{V}_i) = \begin{cases} \dfrac{V_i - V_{imax}}{V_{imax}}, & V_i > V_{imax} \\ 0, & V_i \leq V_{imax} \end{cases} \end{cases}; \quad (35)$$

where $P_v(\overline{V}_i)$ denotes the voltage upper out-of-limit probability; $P_v(V_i)$ denotes the voltage lower out-of-limit probability; $Sev(\overline{V}_i)$ denotes the voltage upper out-of-limit risk value; $Sev(V_i)$ denotes the voltage lower out-of-limit risk value; $V_{imax}$ denotes a maximum voltage allowed for the node i, $V_{imin}$ denotes a minimum voltage; and $V_i$ denotes the voltage of the node i.

The power flow out-of-limit probability and the power flow out-of-limit severity are denoted as:

$$P_s(S_{ij}) = P_s(S_{ij} > S_{ij,max}); \quad (36)$$

$$Sev(S_{ij}) = \begin{cases} \dfrac{S_{ij} - S_{ij,max}}{S_{ij,max}}, & S_{ij} > S_{ij,max} \\ 0, & S_{ij} \leq S_{ij,max} \end{cases}; \quad (37)$$

where $P_s(S_{ij})$ denotes the power flow out-of-limit probability; $Sev(S_{ij})$ denotes the power flow out-of-limit risk value; $S_{ij}$ denotes an active power flow of the branch ij; $S_{ij,max}$ denotes the upper limit of the active power flow allowed for the branch ij.

The voltage out-of-limit risk value is obtained from the voltage out-of-limit probability and the voltage out-of-limit severity, and the power flow out-of-limit risk value is obtained from the power flow out-of-limit probability and the power flow out-of-limit severity, in which the voltage out-of-limit risk value and the power flow out-of-limit risk value are denoted as:

$$R_v = \sum P_v(\overline{V}_i)Sev(\overline{V}_i) + \sum P_v(\underline{V}_i)Sev(\underline{V}_i); \qquad (38)$$

$$R_s = \sum P_s(S_{ij})Sev(S_{ij}); \qquad (39)$$

where $R_v$ and $R_s$ denote the voltage out-of-limit risk value and the power flow out-of-limit risk value.

An entropy weight method and an analytic hierarchy process are used as the method for calculating the weights of the voltage out-of-limit risk value and the power flow out-of-limit risk value, including the following steps.

The voltage and the power flow are taken as two samples of the entropy weight method, and the four indicators of the voltage out-of-limit probability, the voltage out-of-limit severity, the power flow out-of-limit probability and the power flow out-of-limit severity are taken as the inputs of the entropy weight method to calculate the weights, and an objective weight value of the voltage out-of-limit risk value and the power flow out-of-limit risk value is obtained.

The process of calculating the objective weight value of the voltage out-of-limit risk value and the power flow out-of-limit risk value by using an entropy weight method includes:

$$x_{ij}(z) = \frac{1}{X_{ij}(z)}, (i = 1, \ldots, n, j = 1, \ldots, m); \qquad (40)$$

$x_{ij}$ denotes a j-th forward indicator of an i-th sample; $X_{ij}$ denotes a j-th indicator of an i-th sample; z denotes the state; n denotes the number of samples, and m denotes the number of indicators;

$$p_{ij}(z) = \frac{x_{ij}(z)}{\sum_{i=1}^{n} x_{ij}(z)}; \qquad (41)$$

where $p_{ij}$ denotes the proportion of the i-th sample value under the j-th indicator to the indicator;

$$e_j(z) = -k \sum_{i=1}^{n} p_{ij}(z) \ln(p_{ij}(z)); \qquad (42)$$

where $e_j$ denotes the entropy value of the j-th indicator, satisfying $k = 1/\ln(n) > 0$, and $e_j \geq 0$;

$$\omega_j(z) = \frac{1 - e_j(z)}{\sum_{j=1}^{m} 1 - e_j(z)}; \qquad (43)$$

where $\omega_j$ denotes the weight value obtained after normalization by using the entropy weight method as the objective weight value of the voltage out-of-limit risk value and the power flow out-of-limit risk value.

The voltage and the power flow are taken as the scheme layer of the analytic hierarchy process, the out-of-limit probability and the out-of-limit severity are taken as an indicator layer, and a subjective weight value of the voltage out-of-limit risk value and the power flow out-of-limit risk value is obtained.

The subjective weight and the objective weight are combined, and the combined weighting method of the voltage out-of-limit risk value and the power flow out-of-limit risk value is denoted as:

$$\lambda_j(z) = \frac{\mu_j \omega_j(z)}{\sum_{j=1}^{n} \mu_j \omega_j(z)}; \qquad (44)$$

where $\mu_j$ denotes a set of weights obtained by a subjective method, $\omega_j$ denotes a set of weights obtained by an objective method, and $\lambda_j(z)$ denotes a weight value of the combined weight; z denotes the state.

The state probability, the combined weight value, the voltage out-of-limit risk value and the power flow out-of-limit risk value in each state are calculated to obtain an overall risk value, and the risk assessment result is denoted as:

$$\text{Score} = \sum_{z=1}^{zz} P_g(z)(\lambda_1(z)R_v(z) + \lambda_2(z)R_s(z)); \qquad (45)$$

where $P_g(z)$ denotes the probability that a z-th state appears, zz denotes the total number of states, and Score denotes the total risk value (the larger the value, the higher the risk value).

The contents involved in the above embodiment will be explained with reference to a preferred embodiment hereinafter.

As shown in FIG. 1, a risk assessment method for a distributed power distribution network considering a line fault includes the following steps.

Figure 2:
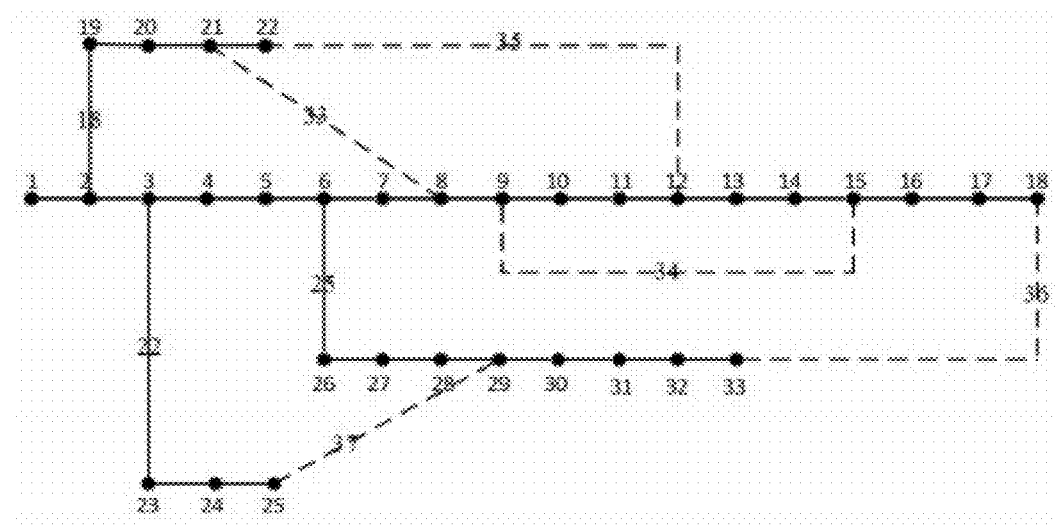
FIG. 2 is a diagram of line topology connection according to an embodiment of the present disclosure.

FIG. 2 is a topology diagram of line connection, and the rationality of the method is verified by an IEEE33 node system.

Figure 3:
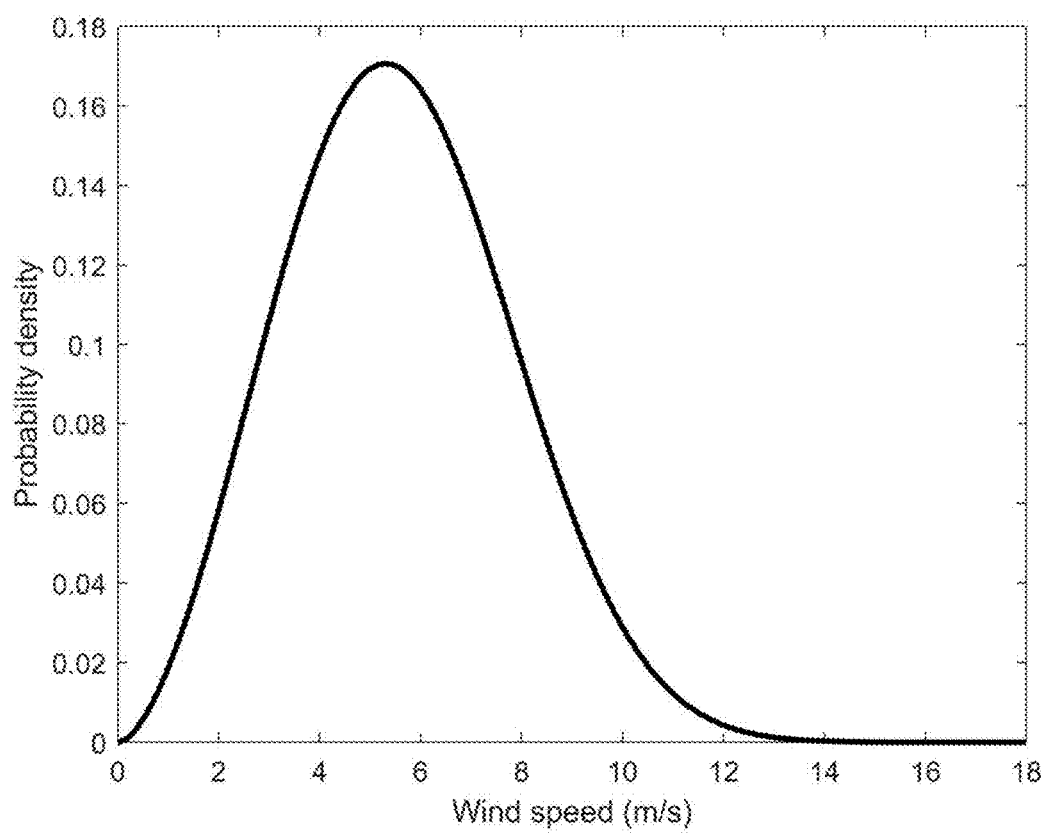
FIG. 3 is a diagram of wind speed prediction probability density distribution according to an embodiment of the present disclosure.
Figure 4:
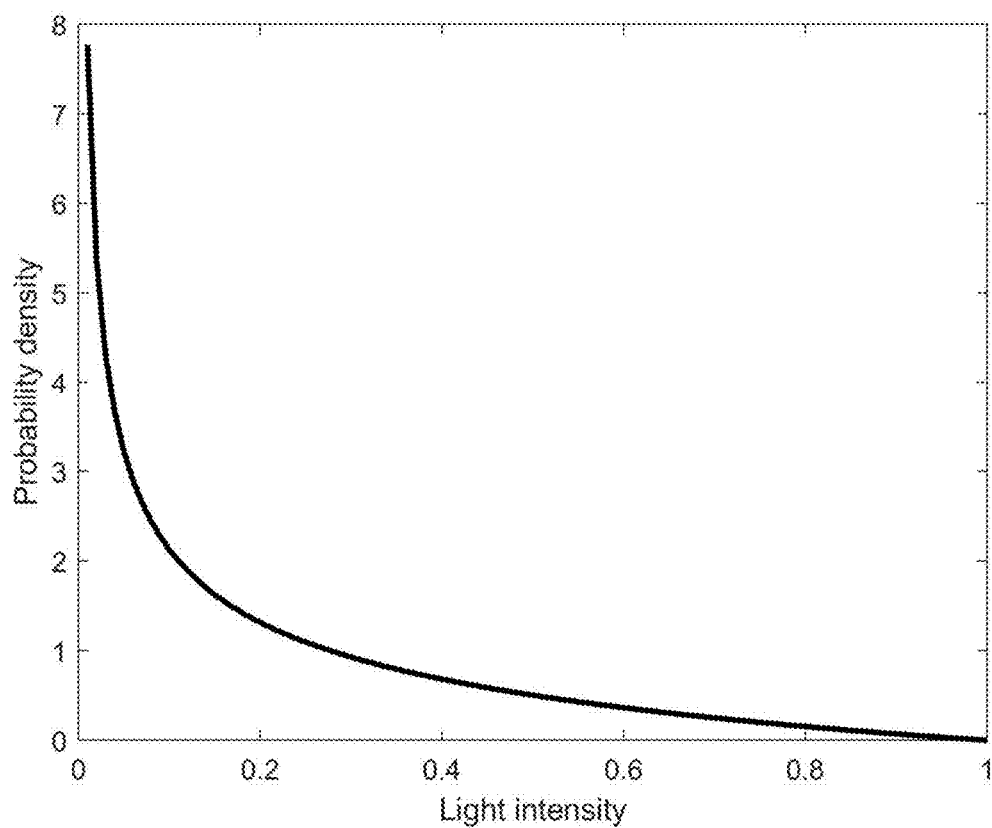
FIG. 4 is a diagram of light intensity prediction probability density distribution according to an embodiment of the present disclosure.

FIG. 3 and FIG. 4 show the wind speed probability density distribution and the light intensity probability density distribution.

Generating data about the wind generating set output and the photovoltaic module output includes:
  establishing the wind speed model of the wind generating set and the light intensity model of the photovoltaic module; generating data about the wind speed of the wind generating set and the light intensity of the photovoltaic module;
  establishing the relationship between the wind speed and the wind generating set output, and establishing the relationship between the light intensity and the photovoltaic module output;
  obtaining the data about the wind generating set output and the photovoltaic module output, respectively, from the generated data about the wind speed and the light intensity, where the formula is as follows:

$$P_{wt}(v) = \begin{cases} 0, & v < v_{ci}, v > v_{co} \\ \frac{P_r \cdot (v - v_{ci})}{v_r - v_{ci}}, & v_{ci} < v < v_r \\ P_r, & v_r < v < v_{co} \end{cases}; \qquad (2)$$

$$Q_{wt}(v) = P_{wt}(v) \tan(\phi_{wt}); \qquad (3)$$

where $P_{wt}(v)$ denotes a magnitude (kW) of an active power of the wind generating set output; $Q_{wt}(v)$ denotes a magnitude (kW) of a reactive power of the wind generating set output; v denotes a real-time wind speed (m/s); $v_{ci}$ denotes a cut-in wind speed (m/s) of the wind generating set; $v_{co}$ denotes the cut-out wind speed (m/s) of the wind generating set; $v_r$ denotes a rated wind speed (m/s) of the wind generating set; $P_r$ denotes a rated power (kW) of the wind generating set; $\phi_{wt}$ denotes a power factor angle of the wind generating set.

$$\begin{cases} P_{pv} = rA\eta \\ Q_{pv} = P_{pv}\tan(\phi_{pv}) \end{cases}; \quad (5)$$

where $P_{pv}$ denotes a magnitude of an active power of the photovoltaic module output; $Q_{pv}$ denotes a magnitude of a reactive power of the photovoltaic module output; r denotes the light intensity (KW/m$^2$); $\eta$ denotes an efficiency value of the conversion of photovoltaic energy into electric energy; A denotes an area (m$^2$); $\phi_{pv}$ denotes a power factor angle of the photovoltaic module.

Generating data about the magnitude of the load includes the following steps.

The load data is acquired according to the expected load value and the variance, where the formula is as follows:

$$f(P) = \frac{1}{\sqrt{2\pi}\sigma_p}\exp\left[-\frac{(P-\mu_p)^2}{2\sigma_p^2}\right]; \quad (6)$$

$$f(Q) = \frac{1}{\sqrt{2\pi}\sigma_q}\exp\left[-\frac{(Q-\mu_p)^2}{2\sigma_q^2}\right]; \quad (7)$$

where P denotes an active power load, $\mu_p$ denotes an active power expected value, and $\sigma_p$ denotes an active power standard deviation; Q denotes a reactive power load, $\mu_q$ denotes a reactive power expected value, and $\sigma_q$ denotes a reactive power standard deviation.

Based on a Monte Carlo method, the generated data is combined to obtain tens of thousands of groups of distributed power output and load samples. The distributed power output samples and the load samples will be used as data input for calculating the power flow.

Figure 5:
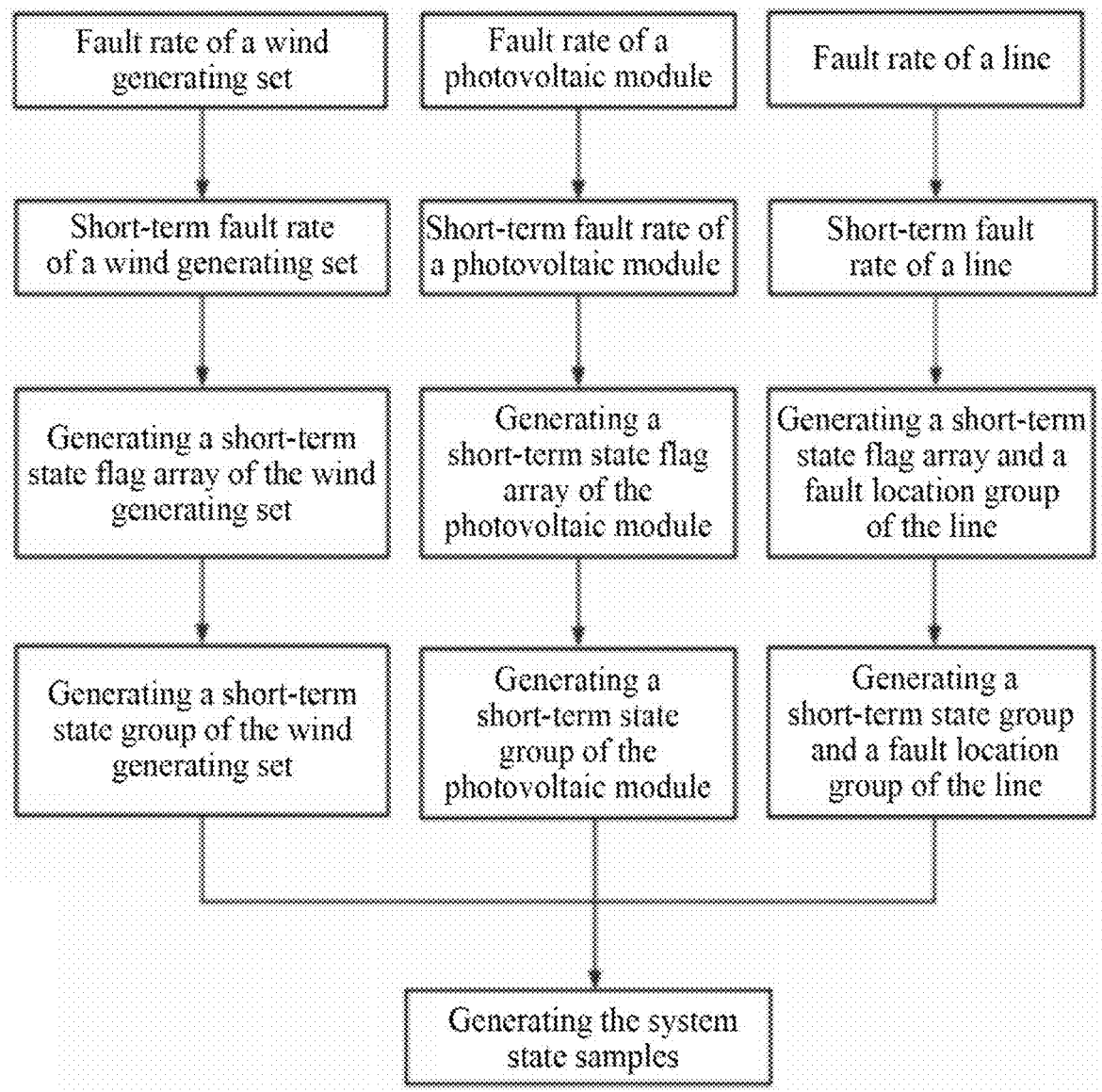
FIG. 5 is a flow chart of operation state prediction of a system component according to an embodiment of the present disclosure.

As shown in FIG. 5, the method flow for judging the operation state of the system component includes the following steps.

The forced outage rate of the wind generating set is used for calculation, the short-term fault state probability of the wind generating set is obtained, and the probability formula is as follows:

$$r_{wt} = \frac{\lambda_{wt}}{\lambda_{wt} + \mu_{wt}}; \quad (8)$$

$$Pr_{wt,t} = 1 - e^{-t \cdot r_{wt}}; \quad (9)$$

where $r_{wt}$ denotes the forced outage rate of the wind generating set; $\lambda_{wt}$ denotes a failure rate of the wind generating set; $\mu_{wt}$ denotes a repair rate of the wind generating set; $Pr_{wt,t}$ denotes a fault probability of the wind generating set in time t; e denotes a natural constant.

The forced outage rate of the photovoltaic module is used for calculation, the short-term fault state probability of the wind generating set is obtained, and the probability formula is as follows:

$$r_{pv} = \frac{\lambda_{pv}}{\lambda_{pv} + \mu_{pv}}; \quad (10)$$

$$Pr_{pv,t} = 1 - e^{-t \cdot r_{pv}}; \quad (11)$$

where $r_{pv}$ denotes a forced outage rate of the photovoltaic module; $\lambda_{pv}$ denotes a failure rate of the photovoltaic module; $\mu_{pv}$ denotes a repair rate of the photovoltaic module; $Pr_{pv,t}$ denotes a fault probability of the photovoltaic module in time t.

A random number between [0,1] is generated as the number k of state flags of the distributed power supply, and the number of state flags is compared with the fault probability to judge the state of the distributed power supply. The formula is as follows:

$$zt_{wt} = \begin{cases} 1; k > Pr_{wt,t} \\ 0; k \le Pr_{wt,t} \end{cases}; \quad (46)$$

$$zt_{pv} = \begin{cases} 1; k > Pr_{pv,t} \\ 0; k \le Pr_{pv,t} \end{cases}; \quad (47)$$

where $zt_{wt}$ denotes the operation state of the wind generating set; $zt_{wt}$ denotes the operation state of the photovoltaic module; 1 stands for normal operation and 0 stands for faults.

The fault state probability of the line has a formula of:

$$Pr_{l,i,t} = 1 - e^{-t \cdot rl,i} \quad (12);$$

where $Pr_{l,i,t}$ denotes a fault probability of the line i in time t; $r_{l,i}$ denotes a fault rate of the line i.

Similarly, a group of random numbers between [0,1] are generated as the number k of state flags k of the line, and a group of random integers are generated to represent the position of the faulty line. The formula for judging the state of the line is:

$$zt_{xl} = \begin{cases} 1; k > Pr_{l,i,t} \\ 0; k \le Pr_{l,i,t} \end{cases}; \quad (48)$$

where $zt_{xl}$ denotes the state of the line; 1 stands for normal operation, 0 stands for faults.

The state of the wind generating set, the photovoltaic module and the line are combined to obtain a system state sample. The state where there is a fault in a line in the system state sample is selected. A faulty line, an objective function and a constraint condition are taken as inputs, and a solver is called to obtain a new power distribution network topology as the basis of calculating the power flow, specifically including:

performing reconstruction based on the Distflow power flow model.

Figure 6:
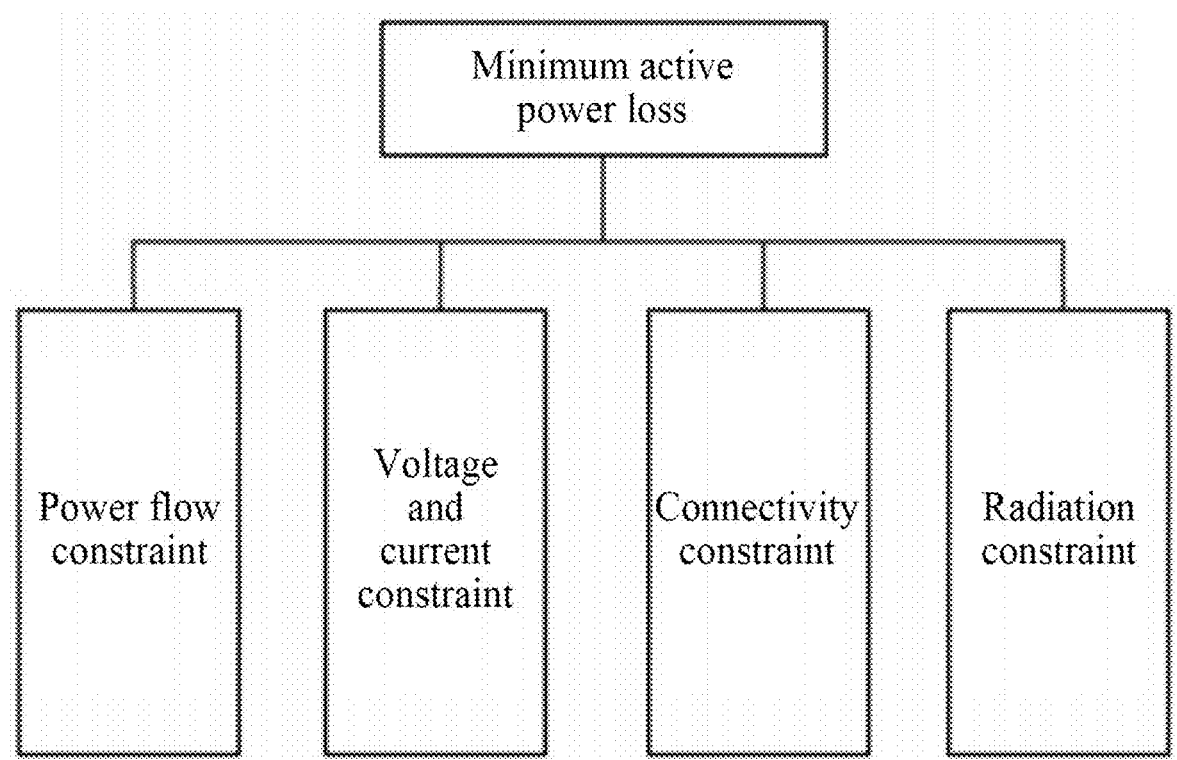
FIG. 6 is a schematic diagram of an objective function and a constraint condition of power distribution network reconstruction according to an embodiment of the present disclosure.

As shown in FIG. 6, taking the minimum active power loss of the network as the objective function, the power flow constraint, the voltage and current constraint, the network connectivity constraint and the radiation constraint are established.

The Cplex solver is called by Matlab. The faulty line, the objective function and the constraint conditions are taken as inputs to solve the power distribution network reconstruction, and the new connection situation is obtained.

Through calculation, it is found that the sum of the probabilities of no faults, single-line faults and two-line faults in a short term accounts for about 97% of all possible state of the lines. The present disclosure only considers the state of faults of two or less lines. The new topology structure obtained in the state of faults of each line is used as the basis of calculating the power flow for calculating the risk value in the state.

The assessment indicator and the assessment method are determined, and the risk value in each state is quantitatively calculated, specifically including:

The output data sample of distributed power supply, the load sample, the state sample of distributed power supply, and the new reconstructed power distribution network topology are taken as inputs, and the voltage of each node and power flow data of each branch in each state are obtained through calculating power flow.

The possibility and the severity are taken as the indicators, and the product of the risk probability and the risk consequence is used as the quantitative analysis of the risk consequence. The indicators include the voltage out-of-limit probability, the voltage out-of-limit severity, the power flow active power out-of-limit probability and the power flow active power out-of-limit severity. The voltage out-of-limit risk value and the branch power flow out-of-limit risk value are respectively denoted as:

$$R_v = \sum P_v(\overline{V}_i) Sev(\overline{V}_i) + \sum P_v(\underline{V}_i) Sev(\underline{V}_i); \quad (38)$$

$$R_s = \sum P_s(S_{ij}) Sev(S_{ij}); \quad (39)$$

where $R_v$ denotes the sum of the risk values of the voltage of all nodes; and $R_s$ denotes the sum of the risk values of the power flow of all branches.

The risk value obtained in each state is calculated. The commonly used assessment methods include an Entropy Weight Method (EWM) and an Analytic Hierarchy Process (AHP) to determine the weight of each indicator, specifically including the following steps.

Figure 7:
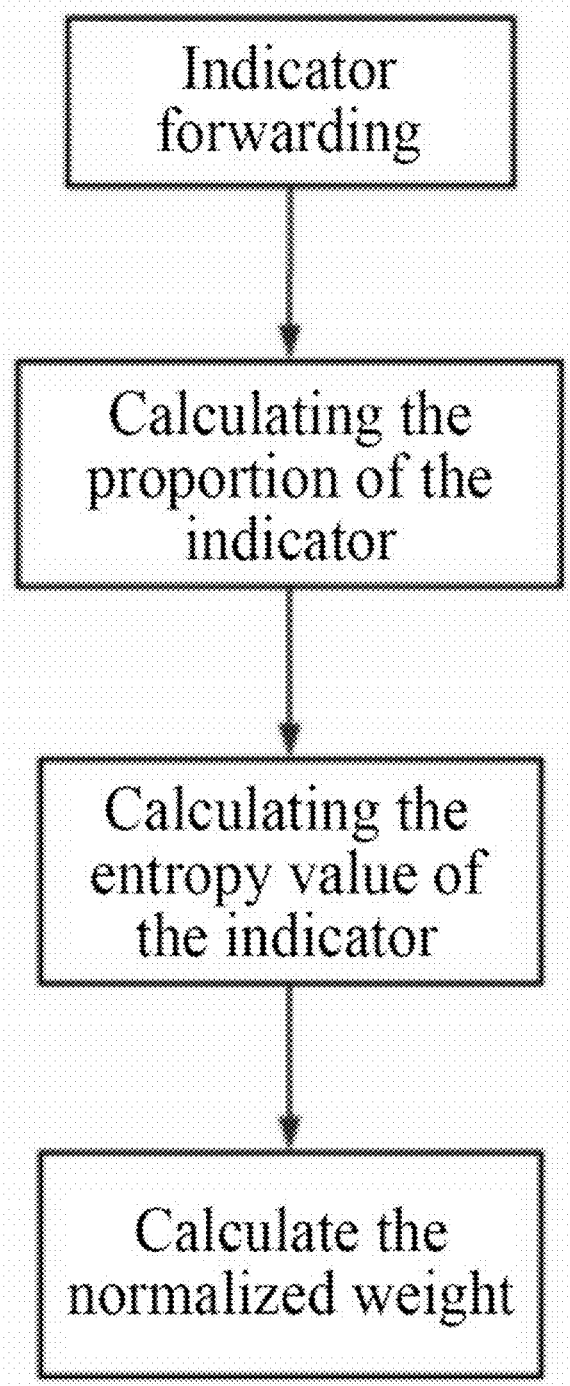
FIG. 7 is a flow chart of solving weights by using an entropy weight method according to an embodiment of the present disclosure.

As shown in FIG. 7, the entropy weight method first needs to forward the two indicators, that is, the out-of-limit probability and the out-of-limit severity. Because the two indicators are negative indicators (the lower the value, the better), and because the out-of-limit probability and the out-of-limit severity are both positive, the forward process can directly take the reciprocal:

$$x_{ij}(z) = \frac{1}{x_{ij}(z)}, (i = 1, \ldots, n, j = 1, \ldots, m); \quad (40)$$

$X_{ij}$ denotes a j-th indicator of an i-th sample; z denotes the state; n denotes the number of samples, and m denotes the number of indicators;

Second, the proportion of the i-th sample value under the j-th indicator to the indicator is calculated:

$$p_{ij}(z) = \frac{x_{ij}(z)}{\sum_{i=1}^{n} x_{ij}(z)}. \quad (41)$$

Finally, the entropy value of the j-th indicator is calculated, and the normalized weight is obtained as the objective weight value of the voltage out-of-limit risk value and the power flow out-of-limit risk value:

$$e_j(z) = -k \sum_{i=1}^{n} p_{ij}(z) \ln(p_{ij}(z)); \quad (42)$$

$$\omega_j(z) = \frac{1 - e_j(z)}{\sum_{j=1}^{m} 1 - e_j(z)}. \quad (43)$$

Figure 8:
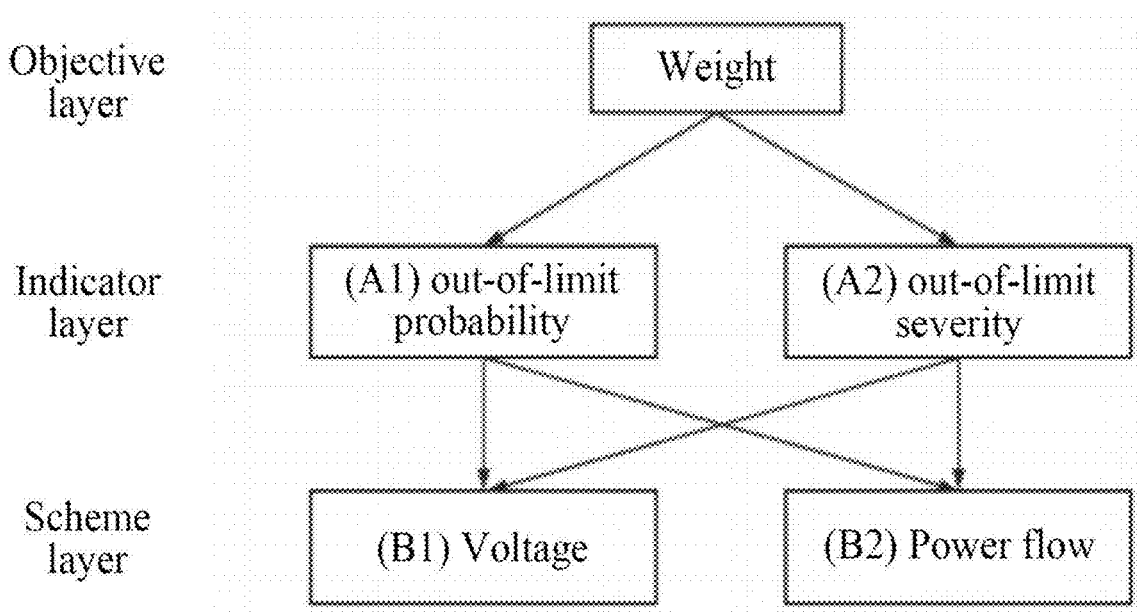
FIG. 8 is a hierarchy system of establishing an analytic hierarchy process according to an embodiment of the present disclosure.

As shown in FIG. 8, the analytic hierarchy process is to establish three hierarchies: the objective, the indicator and the scheme, and then make decision analysis according to a scale system table, take the voltage and the power flow as the scheme layer of the analytic hierarchy process and take the out-of-limit probability and the out-of-limit severity as the indicator layer to obtain the subjective weight value of the voltage out-of-limit risk value and the power flow out-of-limit risk value, specifically including:

establishing a hierarchy system according to the problem; establishing a judgment matrix according to the scale system table; checking the consistency of the judgment matrix to eliminate contradictions; and normalizing eigenvectors to obtain the subjective weight value of the voltage out-of-limit risk value and the power flow out-of-limit risk value.

The combined weighting method combining the subjective weight and the objective weight can make the weight more reasonable. A set of weights obtained by the subjective method is $\mu_j$, and a set of weights obtained by the objective method is $\omega_j(z)$, so that the weight of the combined weight in the final state z is:

$$\lambda_j(z) = \frac{\mu_j \omega_j(z)}{\sum_{j=1}^{n} \mu_j \omega_j(z)}; \quad (44)$$

An overall risk value is obtained according to the state probability, the combined weight value, the voltage out-of-limit risk value and the branch power flow out-of-limit risk value in each state, specifically:

$$\text{Score} = \sum_{z=1}^{zz} P_g(z)(\lambda_1(z) R_v(z) + \lambda_2(z) R_s(z)); \quad (45)$$

where Score denotes the total risk value, $P_g(z)$ denotes the probability that a z-th state appears, and zz denotes the total number of states.

Figure 9:
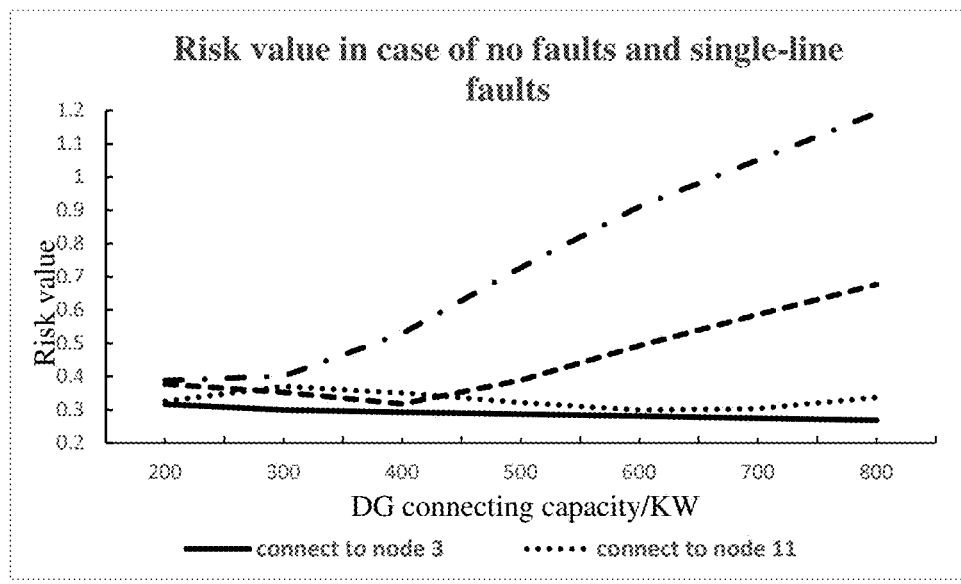
FIG. 9 is a risk value in the case of no faults and single-line faults according to an embodiment of the present disclosure.

As shown in FIG. 9, this embodiment only carries out simulation analysis on the system state considering the case of no faults and single-line faults; the connecting capacity is 200 KW to 800 KW, but the wind generating set and the photovoltaic module are connected to a third node, an eleventh node, a fourteenth node and a seventeenth node in sequence.

It can be seen that as the access point moves backward, the overall risk value of the system shows an upward trend. When the access point is close to the middle and front end, the risk value is relatively stable and low, and the capacity connected to the distributed power supply has little influence. When the access point is close to the middle and back end, and when the capacity connected to the distributed power supply is small, the risk value is low. With the increase of the connecting capacity, the risk value rises rapidly, and the capacity connected to the distributed power supply has great influence.

Figure 10:
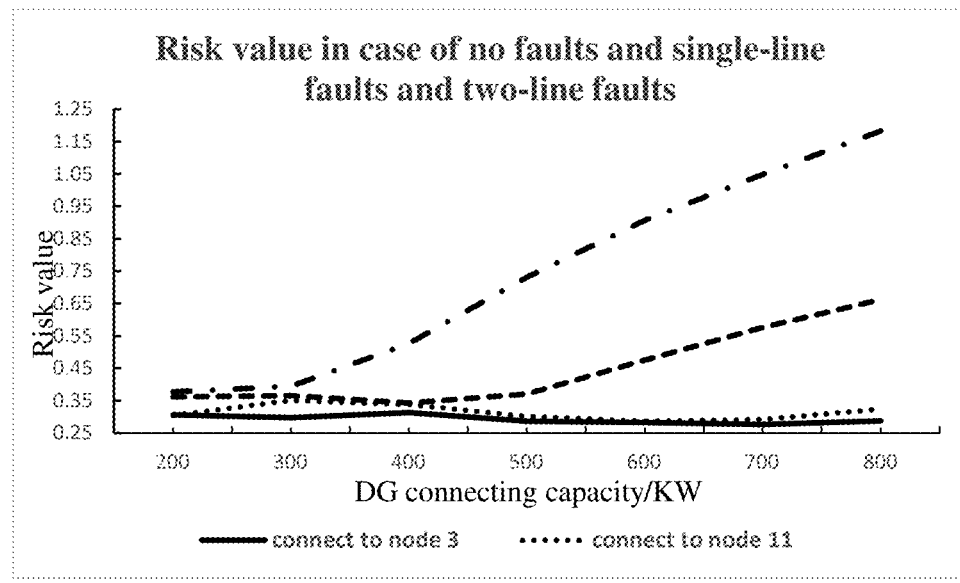
FIG. 10 is a risk value in the case of no faults, single-line faults and two-line faults according to an embodiment of the present disclosure.

As shown in FIG. 10, this embodiment carries out simulation analysis on the system state considering the case of no faults, single-line faults and two-line faults. The connecting capacity is 200 KW to 800 KW, but the wind generating set and the photovoltaic module are connected to a third node, an eleventh node, a fourteenth node and a seventeenth node in sequence.

It can be seen that as the access point moves back from the head end to the middle, the total risk value also shows an upward trend. The overall trend is the same as that of only considering the single-line fault, which shows the rationality of this method. The difference is that in each case, when only the risk value of single-line faults is considered, the corresponding risk value is higher.

Embodiment 2

This embodiment provides a risk assessment device for a distributed power distribution network considering a line fault, including:
- a first sample generation module, which is configured to generate a wind generating set output data sample, a photovoltaic module output data sample and a load sample by pre-establishing a wind generating set output model, a photovoltaic module output model and a load model;
- a second sample generation module, which is configured to generate a system state sample by pre-establishing a short-term fault rate model of a wind generating set, a photovoltaic module and a line, where the system state sample includes state samples of a wind generating set, a photovoltaic module and a line;
- a reconstruction module, which is configured to select the state where there is a fault in a line in the system state sample, take a faulty line, a pre-established objective function and a constraint condition as inputs, and call a solver to obtain the reconstructed power distribution network topology;
- a data processing module, which is configured to take the output data sample of distributed power supply, the load sample, the state sample of the wind generating set and the photovoltaic module, and the reconstructed power distribution network topology as inputs for calculating power flow, and obtain the voltage of each node and power flow data of each branch in each state;
- a risk assessment module, which is configured to take the voltage of each node and the power flow data of each branch as an indicator of security assessment, carry out risk assessment of voltage out-of-limit and power flow out-of-limit, and obtain a risk value of the power distribution network in a short term.

Embodiment 3

This embodiment provides a computer-readable storage medium on which a computer program is stored, where the program, when executed by a processor, implements the steps of the method described in any one of Embodiment 1.

Embodiment 4

This embodiment provides a computer device, including:
- a memory, into which a computer program/instruction is stored;
- a processor, which is configured to execute the computer program/instruction to implement the steps of the method described in any one of Embodiment 1.

Embodiment 5

This embodiment provides a computer program product, including a computer program/instruction, where the computer program/instruction, when executed by a processor, implements the steps of the method described in any one of Embodiment 1.

The above is only the preferred embodiment of the present disclosure. It should be pointed out that those skilled in the art can make several improvements and variations without departing from the technical principles of the present disclosure. These improvements and variations should also be regarded as the scope of protection of the present disclosure.

It should be understood by those skilled in the art that the embodiments of the present disclosure can be provided as a method, a system or a computer program product. Therefore, the present disclosure can take the form of an entirely hardware embodiment, an entirely software embodiment or an embodiment combining software and hardware aspects. Furthermore, the present disclosure may take the form of a computer program product implemented on one or more computer usable storage media (including but not limited to a disk storage, a CD-ROM, an optical storage, etc.) in which computer usable program codes are included.

The present disclosure is described with reference to flow charts and/or block diagrams of methods, devices (systems) and computer program products according to embodiments of the present disclosure. It should be understood that each flow and/or block in the flow chart and/or block diagram and combinations of the flow and/or block in the flow chart and/or block diagram can be implemented by computer program instructions. These computer program instructions may be provided to a processor of a general-purpose computer, a special-purpose computer, an embedded processor or other programmable data processing devices to produce a machine, such that the instructions which are executed by the processor of the computer or other programmable data processing devices produce means for implementing the functions specified in one or more flow in the flow chart and/or one or more blocks in the block diagram.

These computer program instructions may also be stored in a computer-readable memory that can direct a computer or other programmable data processing devices to function in a particular manner, such that the instructions stored in the computer-readable memory produce an article of manufacture including instruction means that implement the functions specified in one or more flow in the flow chart and/or one or more blocks in the block diagram.

These computer program instructions may also be loaded onto a computer or other programmable data processing devices, such that a series of operational steps are executed on the computer or other programmable devices to produce a computer-implemented process, such that the instructions executed on the computer or other programmable devices provide steps for implementing the functions specified in one or more flow in the flow chart and/or one or more blocks in the block diagram.

Finally, it should be explained that the above embodiments are only used to illustrate the technical scheme of the present disclosure, rather than limit the scope of protection of the present disclosure. Although the present disclosure has been described in detail with reference to the above embodiments, those skilled in the art should understand that after reading the present disclosure, those skilled in the field can still make various changes, modifications or equivalent substitutions to the detailed description of the present disclosure, but these changes, modifications or equivalent substitutions are all within the scope of protection of the pending claims of the present disclosure.

What is claimed is:

1. A risk assessment method for a distributed power distribution network considering a line fault, comprising the following steps:

generating a wind generating set output data sample, a photovoltaic module output data sample and a load sample by pre-establishing a wind generating set output model, a photovoltaic module output model and a load model;

generating a system state sample by pre-establishing a short-term fault rate model of a wind generating set, a photovoltaic module and a line, wherein the system state sample comprises state samples of a wind generating set, a photovoltaic module and a line;

selecting the state where there is a fault in a line in the system state sample, taking a faulty line, a pre-established objective function and a constraint condition as inputs, and calling a solver to obtain the reconstructed power distribution network topology;

taking the output data sample of distributed power supply, the load sample, the state sample of the wind generating set and the photovoltaic module, and the reconstructed power distribution network topology as inputs for calculating power flow, and obtaining the voltage of each node and power flow data of each branch in each state; and taking the voltage of each node and the power flow data of each branch as an indicator of security assessment, carrying out risk assessment of voltage out-of-limit and power flow out-of-limit, obtaining a risk value of the power distribution network in a short term, and reconstructing the power distribution network topology based on the obtained risk value;

wherein generating a system state sample by pre-establishing a short-term fault rate model of a wind generating set, a photovoltaic module and a line comprises the following steps:

establishing a short-term fault rate model of a wind generating set, a photovoltaic module and a line, comprising a forced outage rate of a wind generating set, a short-term fault state probability of a wind generating set, a forced outage rate of a photovoltaic module, a short-term fault state probability of a photovoltaic module, and a short-term fault state probability of a line;

wherein the forced outage rate of the wind generating set has a formula of:

$$r_{wt} = \frac{\lambda_{wt}}{\lambda_{wt} + \mu_{wt}}; \quad (8)$$

where $r_{wt}$ denotes the forced outage rate of the wind generating set; $\lambda_{wt}$ denotes a failure rate of the wind generating set; $\mu_{wt}$ denotes a repair rate of the wind generating set;

based on a Monte Carlo method, using the short-term fault state probability of the wind generating set as a comparison value to judge the state of the wind generating set to generate the state sample of the wind generating set, wherein the short-term fault state probability of the wind generating set has a formula of:

$$Pr_{wt,t} = 1 - e^{-t \cdot r_{wt}} \quad (9);$$

where $Pr_{wt,t}$ denotes a fault probability of the wind generating set in time t; $r_{wt}$ denotes a forced outage rate of the wind generating set; e denotes a natural constant;

the forced outage rate of the photovoltaic module has a formula of:

$$r_{pv} = \frac{\lambda_{pv}}{\lambda_{pv} + \mu_{pv}}; \quad (10)$$

where $r_{pv}$ denotes a forced outage rate of the photovoltaic module; $\lambda_{pv}$ denotes a failure rate of the photovoltaic module; $\mu_{pv}$ denotes a repair rate of the photovoltaic module;

based on a Monte Carlo method, using the short-term fault state probability of the wind generating set as a comparison value to judge the state of the photovoltaic module to generate the state sample of the photovoltaic module, wherein the short-term fault state probability of the photovoltaic module has a formula of:

$$Pr_{pv,t} = 1 - e^{-t \cdot r_{pv}} \quad (11);$$

where $Pr_{pv,t}$ denotes a fault probability of the photovoltaic module in time t; $r_{pv}$ denotes a forced outage rate of the photovoltaic module;

based on a Monte Carlo method, using the short-term fault state probability of the line as a comparison value to judge the state of the line to generate the state sample of the line, wherein the short-term fault state probability of the line has a formula of:

$$Pr_{l,i,t} = 1 - e^{-t \cdot r_{l,i}} \quad (12);$$

where $Pr_{l,i,t}$ denotes a fault probability of the line i in time t; $r_{l,i}$ denotes a fault rate of the line i.

2. The risk assessment method for the distributed power distribution network considering the line fault according to claim 1, wherein generating a wind generating set output data sample, a photovoltaic module output data sample and a load sample by pre-establishing a wind generating set output model, a photovoltaic module output model and a load model comprises:

establishing the wind generating set output model according to the relationship between the wind speed and the wind generating set output, wherein the formula is as follows:

$$P_{wt}(v) = \begin{cases} 0 & , v < v_{ci}, v > v_{co} \\ \dfrac{P_r \cdot (v - v_{ci})}{v_r - v_{ci}} & , v_{ci} < v < v_r \\ P_r & , v_r < v < v_{co} \end{cases} \quad (2)$$

$$Q_{wt}(v) = P_{wt}(v)\tan(\phi_{wt}); \quad (3)$$

where $P_{wt}(v)$ denotes a magnitude of an active power of the wind generating set output; $Q_{wt}(v)$ denotes a magnitude of a reactive power of the wind generating set output; v denotes a real-time wind speed; $v_{ci}$ denotes a cut-in wind speed of the wind generating set; $v_{co}$ denotes the cut-out wind speed of the wind generating set; $v_r$ denotes a rated wind speed of the wind generating set; $P_r$ denotes a rated power of the wind generating set; $\phi_{wt}$ denotes a power factor angle of the wind generating set;

based on a Monte Carlo method, combining the obtained data about the magnitude of the active power and the magnitude of the reactive power of the wind generating set output to obtain a wind generating set output data sample;

establishing the photovoltaic module output model according to the relationship between the light intensity and the photovoltaic module output, wherein the formula is as follows:

$$\begin{cases} P_{pv} = rA\eta \\ Q_{pv} = P_{pv}\tan(\phi_{ov}) \end{cases}; \quad (5)$$

where $P_{pv}$ denotes a magnitude of an active power of the photovoltaic module output; $Q_{pv}$ denotes a magnitude of a reactive power of the photovoltaic module output; r denotes the light intensity; $\eta$ denotes an efficiency value of the conversion of photovoltaic energy into electric energy; A denotes a total area of the photovoltaic module; $\phi_{pv}$ denotes a power factor angle of the photovoltaic module;

based on a Monte Carlo method, combining the obtained data about the magnitude of the active power and the magnitude of the reactive power of the photovoltaic module output to obtain a photovoltaic module output data sample;

the magnitude of the active power and the magnitude of the reactive power of the load satisfying normal distribution in a short term, wherein the load model has a formula of:

$$f(P) = \frac{1}{\sqrt{2\pi}\sigma_p}\exp\left[-\frac{(P-\mu_p)^2}{2\sigma_p^2}\right]; \quad (6)$$

$$f(Q) = \frac{1}{\sqrt{2\pi}\sigma_q}\exp\left[-\frac{(Q-\mu_q)^2}{2\sigma_q^2}\right]; \quad (7)$$

where f(P) denotes an active power load model, f(Q) denotes a reactive power load model, P, $\mu_p$, and $\sigma_p$ denote an active power load, an expected value and a standard deviation, respectively; Q, $\mu_q$ and $\sigma_q$ denote a reactive power load, an expected value and a standard deviation, respectively;

based on a Monte Carlo method, combining the obtained data about the active power load and reactive power load to obtain a load sample.

3. The risk assessment method for the distributed power distribution network considering the line fault according to claim 1, wherein selecting the state where there is a fault in a line in the system state sample, taking a faulty line, a pre-established objective function and a constraint condition as inputs, and calling a solver to obtain the reconstructed power distribution network topology comprises:

taking a minimum active power loss as the objective function, which is denoted as:

$$\min P_{loss} = \sum_{ij\in E} I_{ij}^2 r_{ij}; \quad (13)$$

where $P_{loss}$ denotes the sum of active power losses of each branch; ij denotes a branch connecting a node i and a node j; $I_{ij}$ denotes the current of a branch ij; $r_{ij}$ denotes a resistance value of a branch ij; E denotes a set of branches;

a power flow constraint of power distribution network reconstruction is denoted as:

$$\sum_{i\in f(j)} P_{ij} - r_{ij}I_{ij}^{sqr} = \sum_{k\in s(j)} P_{jk} + P_j; \quad (14)$$

$$\sum_{i\in f(j)} Q_{ij} - x_{ij}I_{ij}^{sqr} = \sum_{k\in s(j)} Q_{jk} + Q_j; \quad (15)$$

$$P_j = P_j^{wind} + P_j^{pv} - P_j^{load}; \quad (16)$$

$$Q_j = Q_j^{wind} + Q_j^{pv} - Q_j^{load}; \quad (17)$$

$$U_j^{sqr} = U_i^{sqr} - 2(r_{ij}P_{ij} + x_{ij}Q_{ij}) + (r_{ij}^2 + x_{ij}^2)I_{ij}^{sqr}; \quad (18)$$

$$U_i^{sqr}I_{ij}^{sqr} = P_{ij}^2 + Q_{ij}^2; \quad (19)$$

$$\begin{cases} -\alpha_{ij}M_1 \leq P_{ij} \leq \alpha_{ij}M_1 \\ -\alpha_{ij}M_2 \leq Q_{ij} \leq \alpha_{ij}M_2 \\ -\alpha_{ij}M_3 \leq I_{ij} \leq \alpha_{ij}M_3 \end{cases} \quad (20)$$

$P_{ij}$ and $Q_{ij}$ denote an active power and a reactive power of the branch ij, respectively; $r_{ij}$ denotes a resistance of the branch ij; $x_{ij}$ denotes a reactance of the branch ij; $P_{jk}$ denote an active power from a node j to a child node k; $Q_{jk}$ denotes a reactive power from the node j to the child node k; $P_j$ and $Q_j$ denote the active power injection and the reactive power injection of the node j, respectively;

$P_j^{load}$ and $Q_j^{load}$ denote an active power load and a reactive power load of the node j, respectively;

$P_j^{wind}$ and $Q_j^{wind}$ denote the active power injection and the reactive power injection of the wind generating set of the node j;

$P_j^{pv}$ and $Q_j^{pv}$ denote the active power injection and the reactive power injection of the photovoltaic module of the node j; f(j) and s(j) denote sets of parent nodes and child nodes of the node j; $\alpha_{ij}$ denotes the on-off state variable of the introduced branch, in which there is no power transmission on the line when the line is in the off state while the active power, the reactive power and the current of the closed branch are constrained; $M_1$, $M_2$ and $M_3$ denote positive numbers;

$U_i^{sqr}$ and $I_{ij}^{sqr}$ denote the square or voltage and the square of current; using a big M method to relax the constraint (18), which is denoted as:

$$U_j^{sqr} \leq M(1-\alpha_{ij}) + U_i^{sqr} - 2(r_{ij}P_{ij} + x_{ij}Q_{ij}) + (r_{ij}^2 + x_{ij}^2)I_{ij}^{sqr}; \quad (21)$$

$$U_j^{sqr} \geq -M(1-\alpha_{ij}) + U_i^{sqr} - 2(r_{ij}P_{ij} + x_{ij}Q_{ij}) + (r_{ij}^2 + x_{ij}^2)I_{ij}^{sqr}; \quad (22)$$

limiting the magnitude of the voltage and the magnitude of the current after the power distribution network reconstruction, in which the voltage and current constraints are denoted as:

$$(U_i^{min})^2 \leq U_i^{sqr} \leq (U_i^{max})^2; \quad (23)$$

$$U_0^2 = 1; \quad (24)$$

$$0 \leq I_{ij}^{sqr} \leq (I_{ij}^{max})^2; \quad (25)$$

$U_i^{min}$ and $U_i^{max}$ denote a minimum value and a maximum value allowed for the voltage of the node i; $U_0$ denotes the voltage of a balanced node;

$I_{ij}^{max}$ denotes the maximum current allowed for the line ij; the connectivity and radiation constraints of power distribution network reconstruction are denoted as:

$$\sum_{s \in s(j)} F_{js} - \sum_{i \in f(j)} F_{ij} = -1, j \in N \setminus N_{DG}; \quad (26)$$

$$-M\alpha_{ij} \leq F_{ij} \leq M\alpha_{ij}; \quad (27)$$

$$-M(2-\alpha_{ij}) \leq F_{ij} \leq M(2-\alpha_{ij}); \quad (28)$$

$$\sum_{ij \in \Omega_B} \alpha_{ij} = n-1; \quad (29)$$

where $F_{ij}$ and $F_{js}$ denote the virtual power flow flowing from i to j and flowing from j to s, respectively, and the virtual load is 1; s(j) and f(j) denote a child node and a parent node of the node j; $N_{DG}$ denotes a set of source nodes; n denotes the number of system nodes; $\Omega_B$ denote a set of branches;
relaxing the formula (19), in which the relaxation process is denoted by formulas (30) to (32):

$$U_i^{sqr} I_{ij}^{sqr} \geq P_{ij}^2 + Q_{ij}^2; \quad (30)$$

$$\frac{(I_{ij}^{sqr} + U_i^{sqr})^2 - (I_{ij}^{sqr} - U_i^{sqr})^2}{4} \geq P_{ij}^2 + Q_{ij}^2; \quad (31)$$

$$(I_{ij}^{sqr} + U_i^{sqr})^2 \geq (2P_{ij})^2 + (2Q_{ij})^2 + (I_{ij}^{sqr} - U_i^{sqr})^2; \quad (32)$$

a second-order cone relaxation method is denoted as:

$$\left\| \begin{array}{c} 2P_{ij} \\ 2Q_{ij} \\ I_{ij}^{sqr} - U_i^{sqr} \end{array} \right\|_2 \leq I_{ij}^{sqr} + U_i^{sqr}; \quad (33)$$

calling a Cplex solver through Matlab, solving the reconstruction based on the constraint condition and the objective function, taking the objective function formula (13), the constraint condition formulas (14) to (17), the constraint condition formulas (20) to (29) and the formula (33) as the input of the solver, and taking the on-off of each branch as the output to obtain the reconstructed power distribution network topology.

4. The risk assessment method for the distributed power distribution network considering the line fault according to claim 1, wherein taking the voltage of each node and the power flow data of each branch as an indicator of security assessment, carrying out risk assessment of voltage out-of-limit and power flow out-of-limit, and obtaining a risk value of the power distribution network in a short term comprises:
denoting the voltage out-of-limit probability and the voltage out-of-limit severity as:

$$\begin{cases} P_v(\overline{V}_i) = P_v(V_i > V_{imax}) \\ P_v(V_i) = P_v(V_i < V_{imin}) \end{cases}; \quad (34)$$

$$\begin{cases} Sev(V_i) = \begin{cases} \frac{V_{imin} - V_i}{V_{imin}}, V_i < V_{imin} \\ 0, V_i \geq V_{imin} \end{cases} \\ Sev(\overline{V}_i) = \begin{cases} \frac{V_i - V_{imax}}{V_{imax}}, V_i > V_{imax} \\ 0, V_i \leq V_{imax} \end{cases} \end{cases}; \quad (35)$$

where $P_v(\overline{V}_i)$ denotes the voltage upper out-of-limit probability; $P_v(V_i)$ denotes the voltage lower out-of-limit probability; $Sev(\overline{V}_i)$ denotes the voltage upper out-of-limit risk value; $Sev(V_i)$ denotes the voltage lower out-of-limit risk value; $V_{imax}$ denotes a maximum voltage allowed for the node i, $V_{imin}$ denotes a minimum voltage; and $V_i$ denotes the voltage of the node i;
denoting the power flow out-of-limit probability and the power flow out-of-limit severity as:

$$P_s(S_{ij}) = P_s(S_{ij} > S_{ij,max}); \quad (36)$$

$$Sev(S_{ij}) = \begin{cases} \frac{S_{ij} - S_{ij,max}}{S_{ij,max}}, S_{ij} > S_{ij,max} \\ 0, S_{ij} \leq S_{ij,max} \end{cases}; \quad (37)$$

where $P_s(S_{ij})$ denotes the power flow out-of-limit probability; $Sev(S_{ij})$ denotes the power flow out-of-limit risk value; $S_{ij}$ denotes an active power flow of the branch ij; $S_{ij,max}$ denotes the upper limit of the active power flow allowed for the branch ij;
obtaining the voltage out-of-limit risk value from the voltage out-of-limit probability and the voltage out-of-limit severity, and obtaining the power flow out-of-limit risk value from the power flow out-of-limit probability and the power flow out-of-limit severity, in which the voltage out-of-limit risk value and the power flow out-of-limit risk value are denoted as:

$$R_v = \sum P_v(\overline{V}_i)Sev(\overline{V}_i) + \sum P_v(V_i)Sev(V_i); \quad (38)$$

$$R_s = \sum P_s(S_{ij})Sev(S_{ij}); \quad (39)$$

where $R_v$ and $R_s$ denote the voltage out-of-limit risk value and the power flow out-of-limit risk value;
an entropy weight method and an analytic hierarchy process are used as the method for calculating the weights of the voltage out-of-limit risk value and the power flow out-of-limit risk value, comprising:
taking the voltage and the power flow as two samples of the entropy weight method, and taking the four indicators of the voltage out-of-limit probability, the voltage out-of-limit severity, the power flow out-of-limit probability and the power flow out-of-limit severity as the inputs of the entropy weight method to calculate the weights, and obtaining an objective weight value of the voltage out-of-limit risk value and the power flow out-of-limit risk value;

taking the voltage and the power flow as the scheme layer of the analytic hierarchy process, taking the out-of-limit probability and the out-of-limit severity as an indicator layer, and obtaining a subjective weight value of the voltage out-of-limit risk value and the power flow out-of-limit risk value;

combining the subjective weight and the objective weight, and denoting the combined weighting method of the voltage out-of-limit risk value and the power flow out-of-limit risk value as:

$$\lambda_j(z) = \frac{\mu_j \omega_j(z)}{\sum_{j=1}^{n} \mu_j \omega_j(z)}; \tag{44}$$

where $\mu_j$ denotes a set of weights obtained by a subjective method, $\omega_j$ denotes a set of weights obtained by an objective method, and $\lambda_j(z)$ denotes a weight value of the combined weight; z denotes the state;

calculating the state probability, the combined weight value, the voltage out-of-limit risk value and the power flow out-of-limit risk value in each state to obtain an overall risk value, and denoting the risk assessment result as:

$$\text{Score} = \sum_{z=1}^{zz} P_g(z)(\lambda_1(z)R_v(z) + \lambda_2(z)R_s(z)); \tag{45}$$

where $P_g(z)$ denotes the probability that a z-th state appears, zz denotes the total number of states, and Score denotes the total risk value.

5. The risk assessment method for the distributed power distribution network considering the line fault according to claim 4, wherein the process of calculating the objective weight value of the voltage out-of-limit risk value and the power flow out-of-limit risk value by using an entropy weight method comprises:

$$x_{ij}(z) = \frac{1}{X_{ij}(z)}, (i = 1, \ldots, n, j = 1, \ldots, m); \tag{40}$$

$x_{ij}$ denotes a j-th forward indicator of an i-th sample; $X_{ij}$ denotes a j-th indicator of an i-th sample; n denotes the number of samples, and m denotes the number of indicators;

$$p_{ij}(z) = \frac{x_{ij}(z)}{\sum_{i=1}^{n} x_{ij}(z)}; \tag{41}$$

where $p_{ij}$ denotes the proportion of the i-th sample value under the j-th indicator to the indicator;

$$e_j(z) = -k \sum_{i=1}^{n} p_{ij}(z) \ln(p_{ij}(z)); \tag{42}$$

where $e_j$ denotes the entropy value of the j-th indicator, satisfying k=1/ln(n)>0, and $e_j \geq 0$;

$$\omega_j(z) = \frac{1 - e_j(z)}{\sum_{j=1}^{m} 1 - e_j(z)}; \tag{43}$$

where $\omega_j$ denotes the weight value obtained after normalization by using the entropy weight method as the objective weight value of the voltage out-of-limit risk value and the power flow out-of-limit risk value.

6. A non-transitory computer-readable storage medium on which a computer program is stored, wherein the program, when executed by a processor, implements the steps of the method according to claim 1.

7. A computer device, comprising:
a memory, into which a computer program/instruction is stored;
a processor, which is configured to execute the computer program/instruction to implement the steps of the method according to claim 1.

8. A risk assessment device for a distributed power distribution network considering a line fault, comprising:
a first sample generation module, which is configured to generate a wind generating set output data sample, a photovoltaic module output data sample and a load sample by pre-establishing a wind generating set output model, a photovoltaic module output model and a load model;
a second sample generation module, which is configured to generate a system state sample by pre-establishing a short-term fault rate model of a wind generating set, a photovoltaic module and a line, wherein the system state sample comprises state samples of a wind generating set, a photovoltaic module and a line;
a reconstruction module, which is configured to select the state where there is a fault in a line in the system state sample, take a faulty line, a pre-established objective function and a constraint condition as inputs, and call a solver to obtain the reconstructed power distribution network topology;
a data processing module, which is configured to take the output data sample of distributed power supply, the load sample, the state sample of the wind generating set and the photovoltaic module, and the reconstructed power distribution network topology as inputs for calculating power flow, and obtain the voltage of each node and power flow data of each branch in each state;
a risk assessment module, which is configured to take the voltage of each node and the power flow data of each branch as an indicator of security assessment, carry out risk assessment of voltage out-of-limit and power flow out-of-limit, and obtain a risk value of the power distribution network in a short term;
wherein the reconstruction module is further configured to reconstruct the power distribution network topology based on the obtained risk value;
wherein in the second sample generation module, generating a system state sample by pre-establishing a short-term fault rate model of a wind generating set, a photovoltaic module and a line comprises the following steps:
establishing a short-term fault rate model of a wind generating set, a photovoltaic module and a line, comprising a forced outage rate of a wind generating set, a short-term fault state probability of a wind generating set, a forced outage rate of a photovoltaic module, a short-term fault state probability of a photovoltaic module, and a short-term fault state probability of a line;

wherein the forced outage rate of the wind generating set has a formula of:

$$r_{wt} = \frac{\lambda_{wt}}{\lambda_{wt} + \mu_{wt}}; \qquad (8)$$

where $r_{wt}$ denotes the forced outage rate of the wind generating set; $\lambda_{wt}$ denotes a failure rate of the wind generating set; $\mu_{wt}$ denotes a repair rate of the wind generating set;

based on a Monte Carlo method, using the short-term fault state probability of the wind generating set as a comparison value to judge the state of the wind generating set to generate the state sample of the wind generating set, wherein the short-term fault state probability of the wind generating set has a formula of:

$$Pr_{wt,t} = 1 - e^{-t \cdot r_{wt}} \qquad (9);$$

where $Pr_{wt,t}$ denotes a fault probability of the wind generating set in time t; $r_{wt}$ denotes a forced outage rate of the wind generating set; e denotes a natural constant;

the forced outage rate of the photovoltaic module has a formula of:

$$r_{pv} = \frac{\lambda_{pv}}{\lambda_{pv} + \mu_{pv}}; \qquad (10)$$

where $r_{pv}$ denotes a forced outage rate of the photovoltaic module; $\lambda_{pv}$ denotes a failure rate of the photovoltaic module; $\mu_{pv}$ denotes a repair rate of the photovoltaic module;

based on a Monte Carlo method, using the short-term fault state probability of the wind generating set as a comparison value to judge the state of the photovoltaic module to generate the state sample of the photovoltaic module, wherein the short-term fault state probability of the photovoltaic module has a formula of:

$$Pr_{pv,t} = 1 - e^{-t \cdot r_{pv}} \qquad (11);$$

where $Pr_{pv,t}$ denotes a fault probability of the photovoltaic module in time t; $r_{pv}$ denotes a forced outage rate of the photovoltaic module;

based on a Monte Carlo method, using the short-term fault state probability of the line as a comparison value to judge the state of the line to generate the state sample of the line, wherein the short-term fault state probability of the line has a formula of:

$$Pr_{l,i,t} = 1 - e^{-t \cdot r_{l,i}} \qquad (12);$$

where $Pr_{l,i,t}$ denotes a fault probability of the line i in time t; $r_{l,i}$ denotes a fault rate of the line i.

\* \* \* \* \*